US012179937B1

(12) United States Patent
Zhao et al.

(10) Patent No.: US 12,179,937 B1
(45) Date of Patent: Dec. 31, 2024

(54) HYDRAULIC SYSTEM FOR RAPID MOORING DEVICE OF OFFSHORE OPERATION HELICOPTER AND CONTROL METHOD

(71) Applicant: Yanshan University, Qinhuangdao (CN)

(72) Inventors: Dingxuan Zhao, Qinhuangdao (CN); Zhuxin Zhang, Qinhuangdao (CN); Zhiguo Sun, Qinhuangdao (CN); Xuezhong Ai, Qinhuangdao (CN)

(73) Assignee: Yanshan University, Qinhuangdao (CN)

( * ) Notice: Subject to any disclaimer, the term of this patent is extended or adjusted under 35 U.S.C. 154(b) by 0 days.

(21) Appl. No.: 18/341,780

(22) Filed: Jun. 27, 2023

(51) Int. Cl.
| | |
|---|---|
| *B64F 1/12* | (2006.01) |
| *F15B 1/04* | (2006.01) |
| *F15B 13/02* | (2006.01) |
| *F15B 15/18* | (2006.01) |
| *F15B 19/00* | (2006.01) |

(52) U.S. Cl.
CPC .............. *B64F 1/125* (2013.01); *F15B 1/04* (2013.01); *F15B 13/027* (2013.01); *F15B 15/18* (2013.01); *F15B 19/00* (2013.01); *F15B 2211/855* (2013.01)

(58) Field of Classification Search
CPC .. B64F 1/125; F15B 1/04; F15B 13/04; F15B 13/027; F15B 15/18; F15B 19/00; F15B 2211/855
See application file for complete search history.

(56) References Cited

U.S. PATENT DOCUMENTS

| | | | |
|---|---|---|---|
| 8,613,569 B2 | 12/2013 | Belinsky et al. | |
| 8,974,143 B2 | 3/2015 | Smith | |
| 9,315,963 B2 | 4/2016 | Smith | |
| 2023/0383614 A1* | 11/2023 | Nunez | ................... B65D 85/62 |

* cited by examiner

*Primary Examiner* — Richard G Davis

(74) *Attorney, Agent, or Firm* — True Shepherd LLC; Andrew C. Cheng

(57) ABSTRACT

A hydraulic system for a rapid mooring device of an offshore operation helicopter includes a fuel tank, a hydraulic pump, an electric motor, a check valve, a pressure sensor, a filter, an overflow valve, a two-position four-way electromagnetic reversing valve group, a three-position four-way Y type hydraulically operated reversing valve, an stacked double throttle check valve, an stacked internally controlled hydraulic lock, an externally controlled large flow hydraulic lock, a safety valve, a cartridge valve, an energy accumulator, a pneumatic hydraulic pump, a thick and thin parallel single rod hydraulic cylinder, a mechanical claw unlocking cylinder, a centering lock unlocking cylinder and an emergency lock unlocking cylinder. The control method includes routine action control methods such as rapid capture, straightening, rapid release, transverse mechanical locking, and transverse hydraulic locking in a traction process of the helicopter, a safety protection control method, and an emergency action control method.

8 Claims, 7 Drawing Sheets

| Setting diagram of electromagnetic valves for basic actions of rapid mooring device ||||||||||
|---|---|---|---|---|---|---|---|---|---|
| Serial numbers of electromagnetic valves / Basic actions | 8-1 | 8-2 | 8-3 | 8-4 | 8-5 | 8-6 | 8-7 | 8-8 | 8-9 |
| Rapidly capture the probe rod of the helicopter | ● | ○ | ○ | ○ | ● | ● | ● | ● | ● |
| Straighten the helicopter towards a starboard | ○ | ○ | ○ | ● | ○ | ● | ○ | ○ | ● |
| Straightening the helicopter towards a larboard | ● | ○ | ● | ○ | ○ | ● | ○ | ○ | ● |
| Straighten the helicopter at a center position | X | X | X | X | ○ | ○ | ○ | ○ | ● |
| Rapidly release the probe rod of the helicopter | ○ | ● | ○ | ○ | ● | ● | ● | ● | ● |
| Mechanically and transversely lock the probe rod of the helicopter | X | X | X | X | X | ○ | X | X | ○ |
| Hydraulically and transversely lock the probe rod of the helicopter | X | X | ○ | ○ | X | X | X | ○ | X |
| Note | ● represents setting; ○ represents resetting; X represents arbitrariness |||||||||

FIG. 6

HYDRAULIC SYSTEM FOR RAPID MOORING DEVICE OF OFFSHORE OPERATION HELICOPTER AND CONTROL METHOD

FIELD OF THE INVENTION

The present disclosure relates to the technical field of safely and rapidly recycling and flying offshore operation helicopters and particularly relates to a hydraulic system for a rapid mooring device of an offshore operation helicopter and a control method.

BACKGROUND OF THE INVENTION

The offshore operation helicopter often executes operation tasks in severe sea conditions, and particularly, it is needed to be assisted by a rapid recycling and flying system when landing on a ship deck. As a landing platform is relatively small with a complicated shielding board environment and is affected by sea wind, surges, turbulent flows in an air field of the shielding board and the like, which brings many difficulties to straighten and fly the offshore operation helicopter in processes of capturing, mooring and pulling the offshore operation helicopter to come in and go out of a hangar on the ship, the rapid recycling and flying system, particularly the rapid mooring device needs to have excellent performance. A hydraulic system of the rapid mooring device and a control method are one of fundamental guarantees to complete the above operation with high quality.

In the severe sea conditions, affected by a jolting period, allowed capturing and mooring times are quite short after the offshore operation helicopter lands on the ship, and the capturing action of a mechanical claw of the rapid mooring device is asked to be rapid enough, so that the hydraulic system is needed to provide a large flow; when the helicopter is straightened and pulled to come in the hangar after being captured, the needed straightening force is relatively large; meanwhile, the rapid mooring device needs to complete the operation under the abdomen of the helicopter, the occupied space is much limited, so that a high power hydraulic system cannot be mounted; in addition, after the helicopter is captured, the rapid mooring device further needs to firmly mooring the helicopter on the deck to prevent accidents such as sideslip and tipping; in the tractive straightening process, there is also a condition that the external force of the helicopter is larger than the straightening force of the rapid mooring device, which requires the system to have the ability of bearing a relatively large passive force, so as to prevent the mechanical claw from being pushed in a reverse direction to generate an unpredictable consequence; under conditions of power failure and the like, the hydraulic system needs to be capable of utilizing stored energy or using a standby power source to complete basic actions, so as to guarantee that the helicopter can be recycled and flied; and moreover, manual operation after power failure needs to consider simplicity and accessibility.

To summarize the above severe requirements, the present disclosure provides a hydraulic system for a rapid mooring device of an offshore operation helicopter and a control method, which can satisfy all operational functions required by the rapid mooring device during recycling and flying of the offshore operation helicopter.

SUMMARY OF THE INVENTION

The present disclosure provides a hydraulic system for a rapid mooring device of an offshore operation helicopter and a control method to satisfy the special demand of recycling and flying the aforementioned offshore operation helicopter, so as to guarantee the operation safety of the offshore operation helicopter in recycling and flying to the utmost extent.

To solve the above technical problem, the technical solution adopted by the present disclosure is as below:

a hydraulic system for a rapid mooring device of an offshore operation helicopter, including a fuel tank, a hydraulic pump, an electric motor, a first check valve, a second check valve, a first pressure sensor, a second pressure sensor, a first filter, a second filter, a first overflow valve, a second overflow valve, a two-position four-way electromagnetic reversing valve group, a three-position four-way Y type hydraulically operated reversing valve, an stacked double throttle check valve, an stacked internally controlled hydraulic lock, an externally controlled large flow hydraulic lock, a first safety valve, a second safety valve, a cartridge valve, an energy accumulator, a pneumatic hydraulic pump, a thick and thin parallel single rod hydraulic cylinder, a mechanical claw unlocking cylinder, a centering lock unlocking cylinder, and an emergency lock unlocking cylinder, wherein the thick and thin parallel single rod hydraulic cylinder includes a thick hydraulic cylinder and a thin hydraulic cylinder;

in oilways of the hydraulic system, an oilway connected to a port A of the cartridge valve is called as a load oilway; and an oilway connected to a port B of the cartridge valve is called as an energy accumulating oilway;

the hydraulic pump is connected to the load oilway through the first check valve and the first filter; and the first pressure sensor is connected to an oilway between the first check valve and the first filter;

the pneumatic hydraulic pump is connected to the energy accumulating oilway through the second check valve and the second filter; and the second pressure sensor is connected to an outlet oilway of the second filter;

the first overflow valve and the second overflow valve are respectively connected to the load oilway and the energy accumulating oilway to prevent pressures of the oilways from exceeding a preset valve, so as to protect safety of the oilways;

the thick hydraulic cylinder is connected to the load oilway through the stacked internally controlled hydraulic lock, the stacked double throttle check valve, a third electromagnetic reversing valve and a fourth electromagnetic reversing valve; ports A and B of the thick hydraulic cylinder are respectively connected to ports A of the third electromagnetic reversing valve and the fourth electromagnetic reversing valve through oilways on sides A and B of the stacked double throttle check valve and the stacked internally controlled hydraulic lock; ports P and T of the third electromagnetic reversing valve and the fourth electromagnetic reversing valve are respectively connected to the load oilway and the fuel tank; ports A and B of the thick hydraulic cylinder are respectively connected to the fuel tank through oilways on sides A and B of the externally controlled large flow hydraulic lock and are further connected to the fuel tank through the first safety valve and the second safety valve; control oilways on sides A and B of the externally controlled large flow hydraulic lock are uniformly connected to a port A of an eighth electromagnetic reversing valve, and ports P and T of the eighth electromagnetic reversing valve are respectively connected to the energy accumulating oilway and the fuel tank;

the thin hydraulic cylinder is connected to the load oilway through the three-position four-way Y type hydraulically operated reversing valve, the first electromagnetic reversing valve and the second electromagnetic reversing valve; ports A and B of the thin hydraulic cylinder are respectively connected to ports A and B of the three-position four-way Y type hydraulically operated reversing valve; ports A of the first electromagnetic reversing valve and the second electromagnetic reversing valve are respectively connected to left and right hydraulically controlled oilways of the three-position four-way Y type hydraulically operated reversing valve; and ports P and T of the three-position four-way Y type hydraulically operated reversing valve, the first electromagnetic reversing valve and the second electromagnetic reversing valve are respectively connected to the load oilway and the fuel tank;

a port A of the mechanical claw unlocking cylinder is connected to a port A of a fifth electromagnetic reversing valve; and ports P and T of the fifth electromagnetic reversing valve are respectively connected to the load oilway and the fuel tank;

ports A of the centering lock unlocking cylinder and the emergency lock unlocking cylinder are connected to ports A of a sixth electromagnetic reversing valve and a ninth electromagnetic reversing valve; and ports P and T of the sixth electromagnetic reversing valve and the ninth electromagnetic reversing valve are respectively connected to the energy accumulating oilway and the fuel tank; and ports A and B of the cartridge valve are respectively connected to the load oilway and the energy accumulating oilway; and a control oilway of the cartridge valve is connected to a port B of a seventh electromagnetic reversing valve, and ports P and T of the seventh electromagnetic reversing valve are respectively connected to the energy accumulating oilway and the fuel tank.

The technical solution of the present disclosure is further improved as follows: the pressure of the energy accumulating oilway is between the minimum threshold pressure and the maximum threshold pressure; when the pressure of the energy accumulating oilway sensed by the second pressure sensor is smaller than the minimum threshold pressure of the energy accumulator, the hydraulic pump starts work to fill oil for the energy accumulator; and when the pressure of the energy accumulating oilway sensed is greater than or equal to the maximum threshold pressure of the energy accumulator, the hydraulic pump stops working.

The technical solution of the present disclosure is further improved as follows: the ports P and T of the sixth electromagnetic reversing valve, the seventh electromagnetic reversing valve, the eighth electromagnetic reversing valve and the ninth electromagnetic reversing valve are respectively connected to the energy accumulating oilway and the fuel tank, so as to guarantee that the energy accumulator, the centering lock unlocking cylinder, the emergency lock unlocking cylinder and the externally controlled large flow hydraulic lock are not affected by the pressure of the load oilway.

The technical solution of the present disclosure is further improved as follows: the two-position four-way electromagnetic reversing valve block configured to control basic actions of the rapid mooring device comprises the first electromagnetic reversing valve, the second electromagnetic reversing valve, the third electromagnetic reversing valve, the fourth electromagnetic reversing valve, the fifth electromagnetic reversing valve, the sixth electromagnetic reversing valve, the seventh electromagnetic reversing valve, the eighth electromagnetic reversing valve, and the ninth electromagnetic reversing valve same in model; the two-position four-way electromagnetic reversing valve block an integrated design to be parallelly connected to a same valve block of a control valve, and manual buttons of the nine electromagnetic reversing valves are parallelly exposed out of a side wall on a rear side of the rapid mooring device, so that a worker conveniently performs a manual emergency operation on the buttons of the electromagnetic reversing valves in emergency states such as power failure to complete the basic actions of capturing and releasing the helicopter; and the buttons of the electromagnetic reversing valves comprise a first button controlling the first electromagnetic reversing valve, a second button controlling the second electromagnetic reversing valve, a third button controlling the third electromagnetic reversing valve, a fourth button controlling the fourth electromagnetic reversing valve, a fifth button controlling the fifth electromagnetic reversing valve, a sixth button controlling the sixth electromagnetic reversing valve, a seventh button controlling the seventh electromagnetic reversing valve, an eighth button controlling the eighth electromagnetic reversing valve, and a ninth button controlling the ninth electromagnetic reversing valve.

A control method for the hydraulic system for a rapid mooring device of an offshore operation helicopter, including a routine action control method for the rapid mooring device, a safety protection control method, and an emergency action control method, wherein the routine action control method for the rapid mooring device includes: a control method for rapidly capturing a probe rod of the helicopter, a control method for transversely straightening the helicopter in a process of pulling the helicopter to come in and go out of a hangar, a control method for straightening the helicopter at the center in a process of pulling the helicopter to go out of the hangar, a control method for rapidly releasing the probe rod of the helicopter, a control method for transversely and hydraulically locking the probe rod of the helicopter and a control method for transversely and mechanically locking the probe rod of the helicopter;

B1: the control method for rapidly capturing a probe rod of the helicopter includes the following steps:

B1.1: electrifying the fifth electromagnetic reversing valve, retracting the mechanical claw unlocking cylinder, driving, by a connecting rod mechanism, a locking pin of a mechanical claw to retreat downwards, and opening an upper claw of the mechanical claw under an elastic action;

B1.2: electrifying the sixth electromagnetic reversing valve, stretching out the centering lock unlocking cylinder, and driving, by the connecting rod mechanism, a lock pin of a centering lock to retract;

B1.3: electrifying the ninth electromagnetic reversing valve, stretching out the emergency lock unlocking cylinder, and driving, by the connecting rod mechanism, lock pins of all emergency locks to retract;

B1.4: electrifying the eighth electromagnetic reversing valve, unlocking the externally controlled large flow hydraulic lock, and communicating two cavities of the thick hydraulic cylinder with the fuel tank, wherein the thick hydraulic cylinder floats;

B1.5: the third electromagnetic reserving valve and the fourth electromagnetic reserving valve both being in a power-off state, locking the stacked internally controlled hydraulic lock, and cutting off contact between the thick hydraulic cylinder and the load oilway;

B1.6: electrifying the seventh electromagnetic reversing valve, conducting the cartridge valve, and supplying, by the energy accumulator, oil to the load oilway; and B1.7: powering off the first electromagnetic reversing valve and the second electromagnetic reversing valve, controlling a rod cavity of the thin hydraulic cylinder to feed oil and controlling a rodless cavity thereof to return oil through the three-position four-way Y type hydraulically operated reversing valve, driving, by the thin hydraulic cylinder, the thick hydraulic cylinder to retract rapidly and synchronously, driving, by a left chain, a right chain and a speed increasing pulley block, the opened mechanical claw to move rapidly, and pushing, by the probe rod of the helicopter, the upper claw of the mechanical claw to rotate till the upper claw of the mechanical claw contacts with the probe rod of the helicopter, closing the upper claw of the mechanical claw and a lower claw of the mechanical claw, and lifting the locking pin of the mechanical claw upwards under the action of a twisting force of a square shaft spring to lock the upper claw of the mechanical claw, so as to capture and lock the probe rod of the helicopter;

B2: the control method for transversely straightening the helicopter in a process of pulling the helicopter to come in and go out of a hangar includes a control method for straightening the helicopter towards a starboard and a control method for straightening the helicopter towards a larboard:

B2.1: the control method for straightening the helicopter towards a starboard includes the following steps:

B2.1.1: powering off the fifth electromagnetic reversing valve, and stretching out the mechanical claw unlocking cylinder to prevent the mechanical claw from being opened;

B2.1.2: electrifying the sixth electromagnetic reversing valve, stretching out the centering lock unlocking cylinder, and driving, by the connecting rod mechanism, the lock pin of the centering lock to retract;

B2.1.3: electrifying the ninth electromagnetic reversing valve, stretching out the emergency lock unlocking cylinder, and retracting, by the connecting rod mechanism, lock pins of the emergency locks to retract;

B2.1.4: powering off the eighth electromagnetic reversing valve, and locking the externally controlled large flow hydraulic lock;

B2.1.5: powering off the seventh electromagnetic reversing valve, closing the cartridge valve, and driving, only by the hydraulic pump, the actions of the thick and thin hydraulic cylinders;

B2.1.6: powering off both the first electromagnetic reversing valve and the second electromagnetic reversing valve, controlling the three-position four-way Y type hydraulically operated reversing valve to be located at the center, connecting both the rod cavity and the rodless cavity of the thin hydraulic cylinder to the fuel tank, wherein the thin hydraulic cylinder follows; and B2.1.7: electrifying the third electromagnetic reversing valve and the fourth electromagnetic reversing valve, controlling the rod cavity of the thick hydraulic cylinder to return oil and controlling the rodless cavity thereof to feed oil through the stacked double throttle check valve and the stacked internally controlled hydraulic lock, driving, by the thick hydraulic cylinder, the thin hydraulic cylinder to stretch out synchronously, and driving, by the left chain, the right chain and the speed increasing pulley block, the mechanical claw to generate a slow speed motion and a high output, so as to complete the operation of straightening the offshore operation helicopter towards the starboard in the process of pulling the helicopter to come in and go out of the hangar;

B2.2: the control method for straightening the helicopter towards a larboard includes the following steps:

B2.2.1: powering off the fifth electromagnetic reversing valve, and stretching out the mechanical claw unlocking cylinder to prevent the mechanical claw from being opened;

B2.2.2: electrifying the sixth electromagnetic reversing valve, stretching out the centering lock unlocking cylinder, and driving, by the connecting rod mechanism, the lock pin of the centering lock to retract;

B2.2.3: electrifying the ninth electromagnetic reversing valve, stretching out the emergency lock unlocking cylinder, and driving, by the connecting rod mechanism, lock pins of all emergency locks to retract;

B2.2.4: powering off the eighth electromagnetic reversing valve, and locking the externally controlled large flow hydraulic lock;

B2.2.5: powering off the seventh electromagnetic reversing valve, closing the cartridge valve, and driving, only by the hydraulic pump, the actions of the thick and thin hydraulic cylinders;

B2.2.6: powering off the first electromagnetic reversing valve and the second electromagnetic reversing valve, controlling the three-position four-way Y type hydraulically operated reversing valve to be located in a left position, feeding, by the rod cavity of the thin hydraulic cylinder, oil and returning, by the rodless cavity thereof, oil, and retracting the thin hydraulic cylinder; and B2.2.7: powering off the third electromagnetic reversing valve and the fourth electromagnetic reversing valve, controlling the rod cavity of the thick hydraulic cylinder to feed oil and controlling the rodless cavity thereof to return oil through the stacked double throttle check valve and the stacked internally controlled hydraulic lock, retracting the thick hydraulic cylinder and the thin hydraulic cylinder together, and driving, by the left chain, the right chain and the speed increasing pulley block, the mechanical claw to generate the slow speed motion and the high output, so as to complete the operation of straightening the offshore operation helicopter towards the larboard in the process of pulling the helicopter to come in and go out of the hangar;

B3: the control method for straightening the helicopter at the center in a process of pulling the helicopter to go out of the hangar includes the following steps:

B3.1: powering off the fifth electromagnetic reversing valve, and stretching out the mechanical claw unlocking cylinder to prevent the mechanical claw from being opened;

B3.2: powering off the sixth electromagnetic reversing valve, retracting the centering lock unlocking cylinder, and driving, by the connecting rod mechanism, the lock pin of the centering lock to stretch out;

B3.3: electrifying the ninth electromagnetic reversing valve, stretching out the emergency lock unlocking cylinder, and driving, by the connecting rod mechanism, lock pins of all emergency locks to retract;

B3.4: adjusting the mechanical claw grabbing the probe rod to move towards a center line of the rapid mooring device according to the straightening steps of B2.1.4-B2.1.7 or B2.2.4-B2.2.7; when a center line of the mechanical claw is aligned with a center line of the lock pin of the centering lock, inserting the lock pin of the centering lock into a cotter way on a back side of the mechanical claw, and clamping the mechanical claw in a transverse middle position of the rapid mooring device, wherein in the process of pulling the rapid mooring device to go out of the hangar by a traction winch, the probe rod of the helicopter travels along a center line of a track on a deck all the time, and the helicopter will be automatically straightened to an appropriate posture while being dragged to move along the track;

B4: the control method for rapidly releasing a probe rod of the helicopter includes the following steps:

B4.1: powering off the fifth electromagnetic reversing valve, retracting the mechanical claw unlocking cylinder, driving, by the connecting rod mechanism, the locking pin of the mechanical claw to retreat downwards, and opening the upper claw of the mechanical claw under the elastic action to release the probe rod of the helicopter;

B4.2: electrifying the sixth electromagnetic reversing valve, stretching out the centering lock unlocking cylinder, and driving, by the connecting rod mechanism, the lock pin of the centering lock to retract;

B4.3: electrifying the ninth electromagnetic reversing valve, stretching out the emergency lock unlocking cylinder, and driving, by the connecting rod mechanism, lock pins of all emergency locks to retract;

B4.4: electrifying the eighth electromagnetic reversing valve, unlocking the externally controlled large flow hydraulic lock, and communicating two cavities of the thick hydraulic cylinder with the fuel tank, wherein the thick hydraulic cylinder is in a floating state;

B4.5: powering off both the third electromagnetic reserving valve and the fourth electromagnetic reserving valve both, locking the stacked internally controlled hydraulic lock, and cutting off contact between the thick hydraulic cylinder and the load oilway;

B4.6: electrifying the seventh electromagnetic reversing valve, conducting the cartridge valve, and supplying, by the energy accumulator, oil to the load oilway; and B4.7: powering off the first electromagnetic reversing valve and electrifying the second electromagnetic reversing valve, controlling the rod cavity of the thin hydraulic cylinder to return oil and controlling the rodless cavity thereof to feed oil through the three-position four-way Y type hydraulically operated reversing valve, driving, by the thin hydraulic cylinder, the thick hydraulic cylinder to stretch out rapidly and synchronously, driving, by the left chain, the right chain and the speed increasing pulley block, the mechanical claw to leave the probe rod of the helicopter rapidly and stops till the mechanical claw returns to an initial position for waiting for next capture;

B5: the control method for transversely and mechanically locking the probe rod of the helicopter includes the following steps:

B5.1: powering off the sixth electromagnetic reversing valve, retracting the centering lock unlocking cylinder, and driving, by the connecting rod mechanism, the lock pin of the centering lock to stretch out;

B5.2: powering off the ninth electromagnetic reversing valve, retracting the emergency lock unlocking cylinder, and driving, by the connecting rod mechanism, lock pins of all emergency locks to stretch out;

B5.3: when the mechanical claw is driven by an external force or an internal force to move to a middle position between any two adjacent emergency locks, clamping the mechanical claw between the two adjacent emergency locks; and when the mechanical claw moves till a center line thereof is aligned with a center line of the centering lock, inserting the lock pin of the centering lock into a cotter way of the centering lock on the back of the lower claw of the mechanical claw, wherein the mechanical claw is clamped in the transverse middle position of the rapid mooring device and cannot move; and B6: the control method for transversely and hydraulically locking the probe rod of the helicopter includes the following steps:

B6.1: powering off the eighth electromagnetic reversing valve, the third electromagnetic reversing valve and the fourth electromagnetic reversing valve, controlling the stacked internally controlled hydraulic lock and the externally controlled large flow hydraulic lock to be locked to lock oilways of the rodless cavity and the rod cavity of the thick hydraulic cylinder by means of joint action, and forcibly and hydraulically locking the mechanical claw in a current position; and the safety protection method includes: a power off routine protection method, an overload protection method, a chain fracture protection method, a safe mooring method after capture of the helicopter and an alarm method for filter clogging;

S1: the power off routine protection method includes the following steps:

S1.1: after powering off the rapid mooring device, powering off all the third electromagnetic reversing valve, the fourth electromagnetic reversing valve and the eighth electromagnetic reversing valve, resulting in lock of the stacked internally controlled hydraulic lock and the externally controlled large flow hydraulic lock, wherein the oilways of the two cavities of the thick hydraulic cylinder are locked, and the mechanical claw is hydraulically locked transversely and cannot move; and S1.2: after powering off the rapid mooring device, powering off both the ninth electromagnetic reversing valve and the sixth electromagnetic reversing valve, retracting the emergency lock unlocking cylinder and the centering lock unlocking cylinder under the action of a spring force, and driving, by the connecting rod mechanism, the lock pin of the centering lock and the lock pin of the emergency lock to stretch out; under a condition that the hydraulic lock in S1.1 cannot be completely locked, if the mechanical claw moves continuously, mechanically locking the mechanical claw between two adjacent transverse emergency locks or mechanically locking the mechanical claw in the transverse middle position of the rapid mooring device by the centering lock, wherein the operation safety of the offshore operation helicopter is further improved;

S2: the overload protection method includes the following steps:

in the processes of mooring, pulling and straightening the helicopter, when a load face applied by the probe rod of the helicopter to the mechanical claw exceeds active power outputted by a hydraulic system due to force majeure, automatically locking the stacked internally controlled hydraulic lock and the externally controlled large flow hydraulic lock; locking the oilways of the two cavities of the thick hydraulic cylinder; and locking positions of the left chain, the right chain and the mechanical claw;

S3: the chain fracture protection method includes the following steps:

when the left chain or the right chain ruptures, transmitting, by a chain rupture alarm sensor, a chain rupture alarm signal to an upper computer; giving, by the upper computer, a command of "mechanically locking the probe rod of the helicopter" to a rapid mooring device controller; after executing the abovementioned step B5, stretching out the lock pin of the centering lock and the lock pins of all the emergency locks, and if the mechanical claw moves continuously, mechanically locking the mechanical claw between two adjacent transverse emergency locks by the lock pins of the emergency locks or mechanically locking the mechanical claw in the transverse middle position of the rapid mooring device by the lock pin of the centering lock;

S4: the safe mooring method after capture of the helicopter includes the following steps:

after executing the abovementioned step B1 the stopping moving mechanical claw and mooring the helicopter in a fixed position; when the system works normally, mooring the helicopter by step B5 or B6; and when the system is subjected to power off, overload or chain rupture failure, mooring the helicopter by steps S1, S2 and S3; and S5: the alarm method for filter clogging includes the following steps:

in a process of feeding oil to the energy accumulator by the hydraulic pump, detecting a pressure difference value between the first pressure sensor and the second pressure sensor, and when the pressure difference value exceeds a preset alarm threshold of filter clogging, giving, by the rapid mooring device controller, an alarm signal to the upper controller; and the emergency action control method includes: a basic action control method using the energy accumulator as a standby power source and a basic action control method using high pressure air as the standby power source;

E1: the basic action control method using the energy accumulator as a standby power source includes the following steps:

under a condition that the hydraulic system is just powered off, the pressure of oil stored by the energy accumulator is greater than or equal to the minimum threshold pressure of the energy accumulator, completing, by the rapid mooring device, a plurality of cycles of actions of capturing and releasing the probe rod of the helicopter; by means of the basic action control method for the rapid mooring device in steps B1-B6, completing, by the rapid mooring device, the actions of capturing and releasing the probe rod of the helicopter by way of manually pushing setting buttons of the electromagnetic reversing valves replacing electrification of corresponding electromagnetic reversing valves; and E2: the basic action control method using high pressure air as the standby power source includes the following steps:

after powering off the rapid mooring device and exhausting energy stored in the energy accumulator, connecting a hose of compressed air for ship to an air input port of a pneumatic hydraulic pump of the rapid mooring device, filling, by the pneumatic hydraulic pump, a liquid to the energy accumulator to reach a working pressure of the rapid mooring device; the subsequent operating method is the same as E1, and completing the actions of capturing and releasing the probe rod of the helicopter by the rapid mooring device by way of manually pushing setting buttons of the electromagnetic reversing valves replacing electrification of corresponding electromagnetic reversing valves.

By adopting the above technical solution, the present disclosure makes technological progresses as below:

1. By adopting the parallel driving mode of the thick and thin hydraulic cylinders, the present is driven by the thin hydraulic cylinder during high speed; when a high output is needed, the present disclosure is jointly driven by the thick and thin hydraulic cylinders, which under the condition of limited working space, solves the contradiction between high speed needed in the process of capturing the offshore operation helicopter and the high output needed in the tractive straightening process.

2. The driving oilways of the thick and thin hydraulic cylinders are provided with the stacked internally controlled hydraulic lock and the externally controlled large flow hydraulic lock which are capable of bearing a load greater than a straightening force, so that the hydraulic cylinders are not pushed in the reverse direction when the external force is greater than the active force of the hydraulic system, thereby improving the working safety of the system.

3. By arranging the energy accumulator and the pneumatic hydraulic pump, the basic actions of the rapid mooring device can still be manually completed by using the standby energy source under the power off condition, so that the adaptability of the system is improved greatly.

4. By arranging the emergency locks, the median lock and the chain rupture sensor, the present disclosure enables the mechanical lock to be locked near the transverse current position of the mooring device under the power off or chain rupture condition, which can reliably guarantee the safety of the moored helicopter in contingency.

5. By comparing whether the difference value between the pressure at the outlet of the hydraulic pump and the pressure at the outlet of the energy accumulator is greater than the set threshold to determine whether the filter is clogged, the problem of easily generating false alarm under a violent vibration condition by using a conventional pressure difference sensor, the quantity of used element is reduced, and clogging detection of the filter is more reliable and applicable.

6. The present disclosure controls the basic actions of the rapid mooring device by jointly adopting 9 electromagnetic reversing valves with same model; by reasonably designing an integrated block of the hydraulic valve, all the electromagnetic reversing valves are arranged together in an appressing manner and the manual setting ends of the electromagnetic reversing valves are exposed to the rear side wall of the rapid mooring device. Under the power off condition, all basic actions of the rapid mooring device can be completed by manually pushing the setting buttons of the electromagnetic reversing valves, thereby further improving the working reliability of the rapid mooring device of the offshore operation helicopter.

BRIEF DESCRIPTION OF THE DRAWINGS

FIG. 6 is a setting diagram of electromagnetic reversing valves of routine actions of the rapid mooring device according to an embodiment of the present disclosure.

Figure 1:
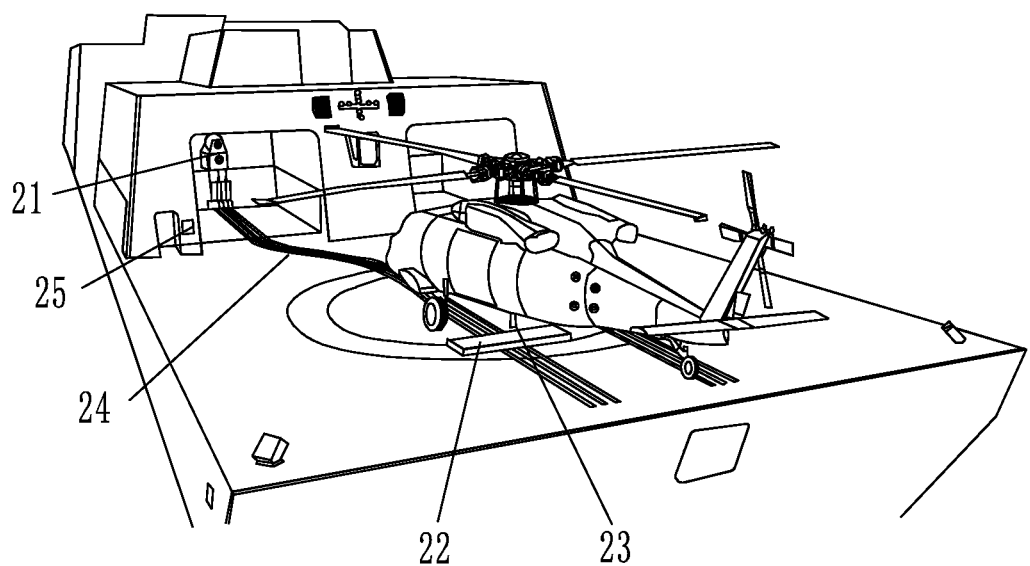
FIG. 1 is a schematic diagram of a safe and rapid recycling and flying system for an offshore operation helicopter according to an embodiment of the present disclosure.

In the drawings, 1—fuel tank; 2—hydraulic cylinder; 3—electric motor; 4-1—first check valve; 4-2—second check valve; 5-1—first pressure sensor; 5-2—second pressure sensor; 6-1—first filter; 6-2—second filter; 7-1—first overflow valve; 7-2—second overflow valve; 8—two-position four-way electromagnetic reversing valve group; 8-1—first electromagnetic reversing valve; 8-2—second electromagnetic reversing valve; 8-3—third electromagnetic reversing valve; 8-4—fourth electromagnetic reversing valve; 8-5—fifth electromagnetic reversing valve; 8-6—sixth electromagnetic reversing valve; 8-7—seventh electromagnetic reversing valve; 8-8—eighth electromagnetic reversing valve; 8-9—ninth electromagnetic reversing valve; 9—three-position four-way hydraulically operated reversing valve; 10—stacked double throttle check valve; 11—stacked internally controlled hydraulic lock; 12—externally controlled large flow hydraulic lock; 13-1—first safety valve; 13-2—second safety valve; 14—cartridge valve; 15—energy accumulator; 16—pneumatic hydraulic pump; 17—thick and thin parallel single rod hydraulic cylinder; 17-1—thick hydraulic cylinder; 17-2—thin hydraulic cylinder; 18—mechanical claw unlocking cylinder; 19—centering lock unlocking cylinder; 20—emergency lock unlocking cylinder; 21—hydraulic traction winch; 22—rapid mooring device; 23—probe rod of helicopter; 24—preset track; 25—control device; 26—mechanical claw; 27—lock pin of centering lock; 28-1—lock pin of first emergency lock; 28-2—lock pin of second emergency lock; 28-3—lock pin of third emergency lock; 28-4—lock pin of fourth emergency lock; 28-5—lock pin of fifth emergency lock; 28-6—lock of sixth emergency lock; 28-7—lock pin of seventh emergency lock; 28-8—lock pin of eighth emergency lock; 28-9—lock pin of ninth emergency lock; 28-10—lock pin of tenth emergency lock; 29—chain rupture alarm sensor; 30—locking pin of mechanical claw; 31—lower claw of mechanical claw; 32—upper claw of mechanical claw; 33-1—left chain; 33-2—right chain; 34—rapid mooring device controller; 35—valve block of control valve; 36-1—first button; 36-2—second button; 36-3—third button; 36-4—fourth button; 36-5—fifth button; 36-6—sixth button; 36-7—seventh button; 36-8—eighth button; 36-9—ninth button.

DETAILED DESCRIPTION OF PREFERRED EMBODIMENTS

The present disclosure will be described in detail below in combination with drawings and embodiments:

in the description of the present disclosure, it is to be understood that the terms "central", "longitudinal", "transverse", "length", "width", "thickness", "upper", "lower", "front", "back", "left", "right", "vertical", "horizontal", "top", "bottom", "inner", "outer", etc. indicate azimuthal or positional relations on the basis of those shown in the drawings only for ease of description of the present disclosure and for simplicity of description, and are not intended to indicate or imply that the referenced device or element must have a particular orientation and be constructed and operative in a particular orientation, and thus may not be construed as a limitation on the present disclosure.

In addition, the terms "first" and "second" are merely used for descriptive purposes and cannot be construed as indicating or implying relative importance or implicitly specifying the number of indicated technical features. Thus, features defining "first", "second" and the like can expressively or implicitly include at least one feature. In the description of the present disclosure, unless otherwise specified, "a plurality of" means at least two, for example, two, three and the like.

As shown in FIG. 1, a rapid recycling and flying system for an offshore operation helicopter on a ship includes a hydraulic traction winch 21, a rapid mooring device 22, a probe rod 23 of the helicopter, a preset track 24, a control device 25 and the like. The probe rod 23 of the helicopter is mounted under the abdomen of the helicopter, and the control device 25 controls the hydraulic traction winch 21 to pull the rapid mooring device 22 to move along the preset track 24 according to the position of the helicopter determined by a navigation device; the rapid mooring device 22 and the hydraulic traction winch 21 are matched in use to straighten and fly the offshore operation helicopter in the processes of capturing, mooring and pulling the offshore operation helicopter to come in and go out of a hangar.

Figure 2:
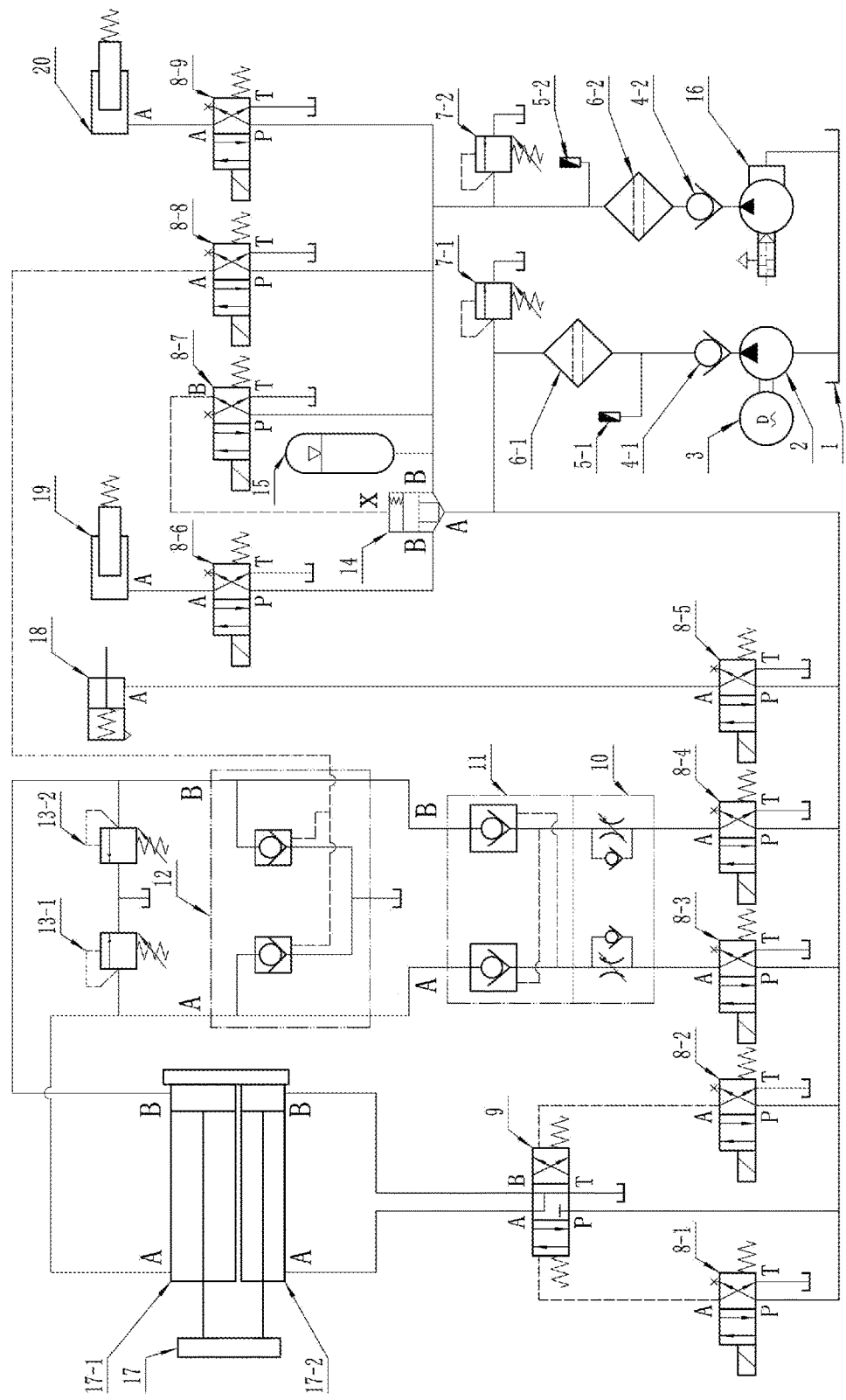
FIG. 2 is a diagram of a hydraulic system of the rapid mooring device of the offshore operation helicopter according to an embodiment of the present disclosure.

As shown in FIG. 2, a hydraulic system for the rapid mooring device of the offshore operation helicopter includes a fuel tank 1, a hydraulic pump 2, an electric motor 3, a first check valve 4-1, a second check valve 4-2, a first pressure sensor 5-1, a second pressure sensor 5-2, a first filter 6-1, a second filter 6-2, a first overflow valve 7-1, a second overflow valve 7-2, a two-position four-way electromagnetic reversing valve group 8, a three-position four-way Y type hydraulically operated reversing valve 9, an stacked double throttle check valve 10, an stacked internally controlled hydraulic lock 11, an externally controlled large flow hydraulic lock 12, a first safety valve 13-1, a second safety valve 13-2, a cartridge valve 14, an energy accumulator 15, a pneumatic hydraulic pump 16, a thick and thin parallel single rod hydraulic cylinder 17, a mechanical claw unlocking cylinder 18, a centering lock unlocking cylinder 19, and an emergency lock unlocking cylinder 20.

The thick and thin parallel single rod hydraulic cylinder 17 includes a thick hydraulic cylinder 17-1 and a thin hydraulic cylinder 17-2. In oilways of the hydraulic system, an oilway connected to a port A of the cartridge valve 14 is called as a load oilway; and an oilway connected to a port B of the cartridge valve 14 is called as an energy accumulating oilway.

The hydraulic pump 2 is connected to the load oilway through the first check valve 4-1 and the first filter 6-1; and the first pressure sensor 5-1 is connected to an oilway between the first check valve 4-1 and the first filter 6-1.

The pneumatic hydraulic pump 16 is connected to the energy accumulating oilway through the second check valve 4-2 and the second filter 6-2; and the second pressure sensor 5-2 is connected to an outlet oilway of the second filter 6-2.

The first overflow valve 7-1 and the second overflow valve 7-2 are respectively connected to the load oilway and the energy accumulating oilway to prevent pressures of the oilways from exceeding a preset valve, so as to protect safety of the oilways.

The thick hydraulic cylinder 17-1 is connected to the load oilway through the stacked internally controlled hydraulic lock 11, the stacked double throttle check valve 10, a third electromagnetic reversing valve 8-3 and a fourth electromagnetic reversing valve 8-4; ports A and B of the thick hydraulic cylinder 17-1 are respectively connected to ports A of the third electromagnetic reversing valve 8-3 and the fourth electromagnetic reversing valve 8-4 through oilways on sides A and B of the stacked double throttle check valve 10 and the stacked internally controlled hydraulic lock 11; ports P and T of the third electromagnetic reversing valve 8-3 and the fourth electromagnetic reversing valve 8-4 are respectively connected to the load oilway and the fuel tank 1; ports A and B of the thick hydraulic cylinder 17-1 are respectively connected to the fuel tank 1 through oilways on sides A and B of the externally controlled large flow hydraulic lock 12 and are further connected to the fuel tank 1 through the first safety valve 13-1 and the second safety valve 13-2; control oilways on sides A and B of the externally controlled large flow hydraulic lock 12 are uniformly connected to a port A of an eighth electromagnetic reversing valve 8-8, and ports P and T of the eighth electromagnetic reversing valve 8-8 are respectively connected to the energy accumulating oilway and the fuel tank 1.

The thin hydraulic cylinder 17-2 is connected to the load oilway through the three-position four-way Y type hydraulically operated reversing valve 9, the first electromagnetic reversing valve 8-1 and the second electromagnetic reversing valve 8-2; ports A and B of the thin hydraulic cylinder 17-2 are respectively connected to ports A and B of the three-position four-way Y type hydraulically operated reversing valve 9; ports A of the first electromagnetic reversing valve 8-1 and the second electromagnetic reversing valve 8-2 are respectively connected to left and right hydraulically controlled oilways of the three-position four-way Y type hydraulically operated reversing valve 9; and ports P and T of the three-position four-way Y type hydraulically operated reversing valve 9, the first electromagnetic reversing valve 8-1 and the second electromagnetic reversing valve 8-2 are respectively connected to the load oilway and the fuel tank 1.

A port A of the mechanical claw unlocking cylinder 18 is connected to a port A of a fifth electromagnetic reversing valve 8-5; and ports P and T of the fifth electromagnetic reversing valve 8-5 are respectively connected to the load oilway and the fuel tank 1.

Ports A of the centering lock unlocking cylinder 19 and the emergency lock unlocking cylinder 20 are connected to ports A of a sixth electromagnetic reversing valve 8-6 and a ninth electromagnetic reversing valve 8-9; and ports P and T of the sixth electromagnetic reversing valve 8-6 and the ninth electromagnetic reversing valve 8-9 are respectively connected to the energy accumulating oilway and the fuel tank 1.

Ports A and B of the cartridge valve 14 are respectively connected to the load oilway and the energy accumulating oilway; and a control oilway of the cartridge valve is connected to a port B of a seventh electromagnetic reversing valve 8-7, and ports P and T of the seventh electromagnetic reversing valve 8-7 are respectively connected to the energy accumulating oilway and the fuel tank 1.

The pressure of the energy accumulating oilway is between the minimum threshold pressure and the maximum threshold pressure; when the pressure of the energy accumulating oilway sensed by the second pressure sensor 5-2 is smaller than the minimum threshold pressure of the energy accumulator, the hydraulic pump 2 starts work to fill oil for the energy accumulator; and when the pressure of the energy accumulating oilway sensed is greater than or equal to the maximum threshold pressure of the energy accumulator, the hydraulic pump 2 stops working.

As shown in FIG. 2, the ports P and T of the sixth electromagnetic reversing valve 8-6, the seventh electromagnetic reversing valve 8-7, the eighth electromagnetic reversing valve 8-8 and the ninth electromagnetic reversing valve 8-9 are respectively connected to the energy accumulating oilway and the fuel tank 1, so as to guarantee that the energy accumulator 15, the centering lock unlocking cylinder 19, the emergency lock unlocking cylinder 20 and the externally controlled large flow hydraulic lock 12 are not affected by the pressure of the load oilway.

Figure 3:
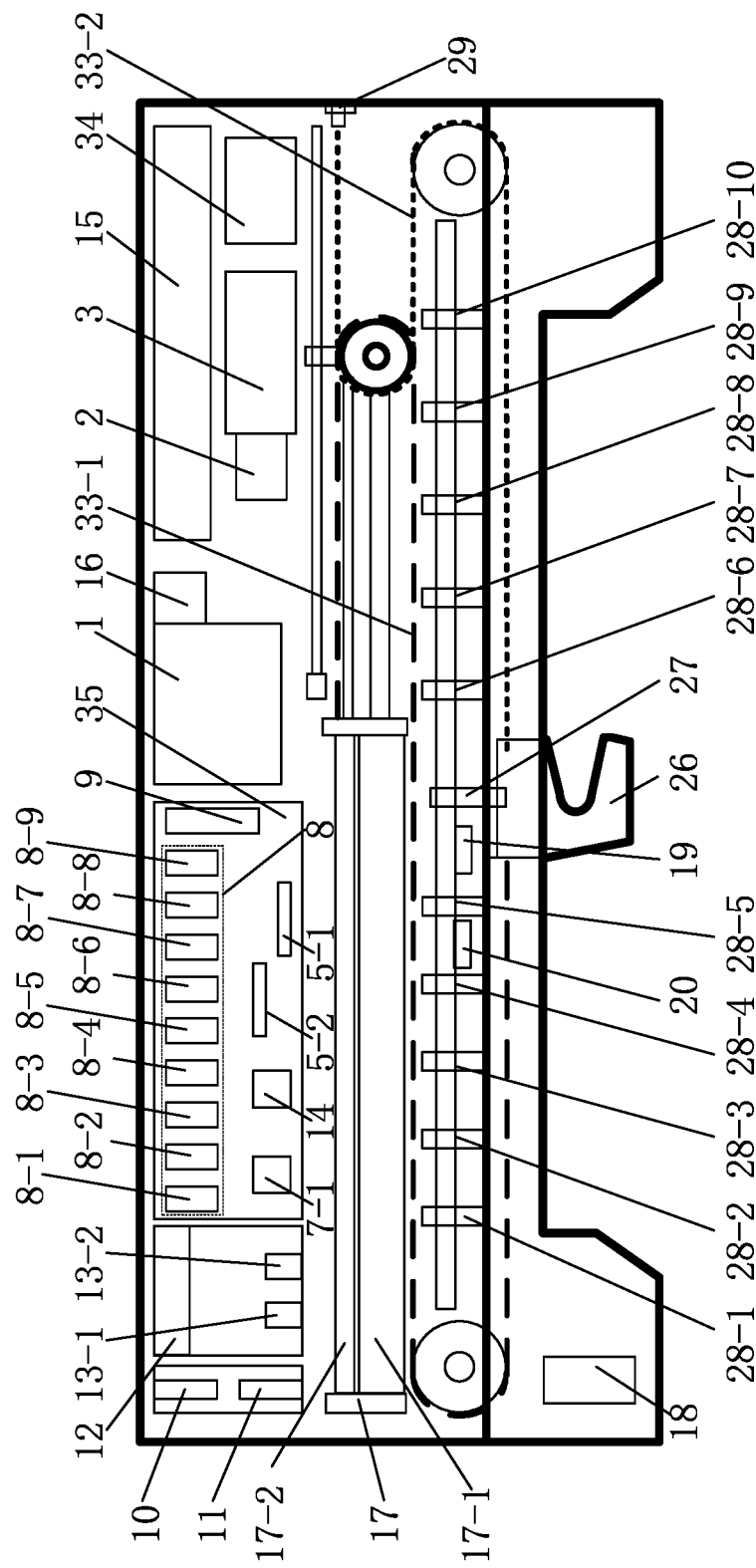
FIG. 3 is a schematic diagram of a structural composition of the rapid mooring device according to an embodiment of the present disclosure.
Figure 4:
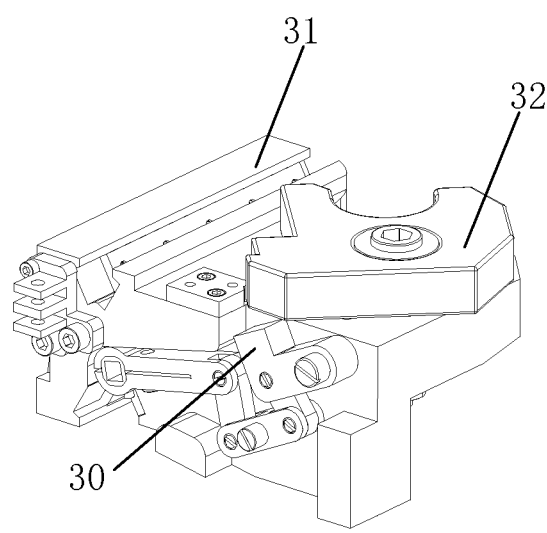
FIG. 4 is a schematic diagram of an opened state of a mechanical claw of the rapid mooring device according to an embodiment of the present disclosure.
Figure 5:
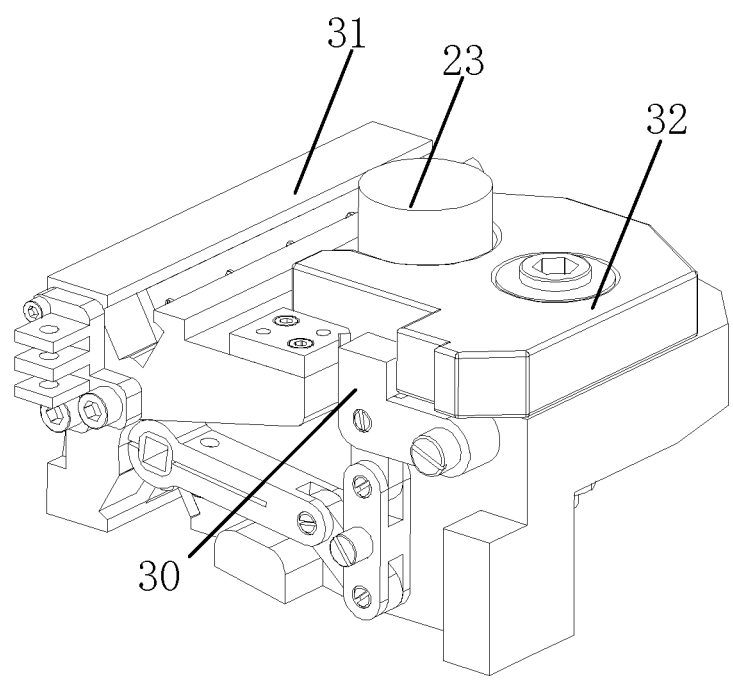
FIG. 5 is a schematic diagram of a closed state of a mechanical claw of the rapid mooring device according to an embodiment of the present disclosure.
Figure 7:
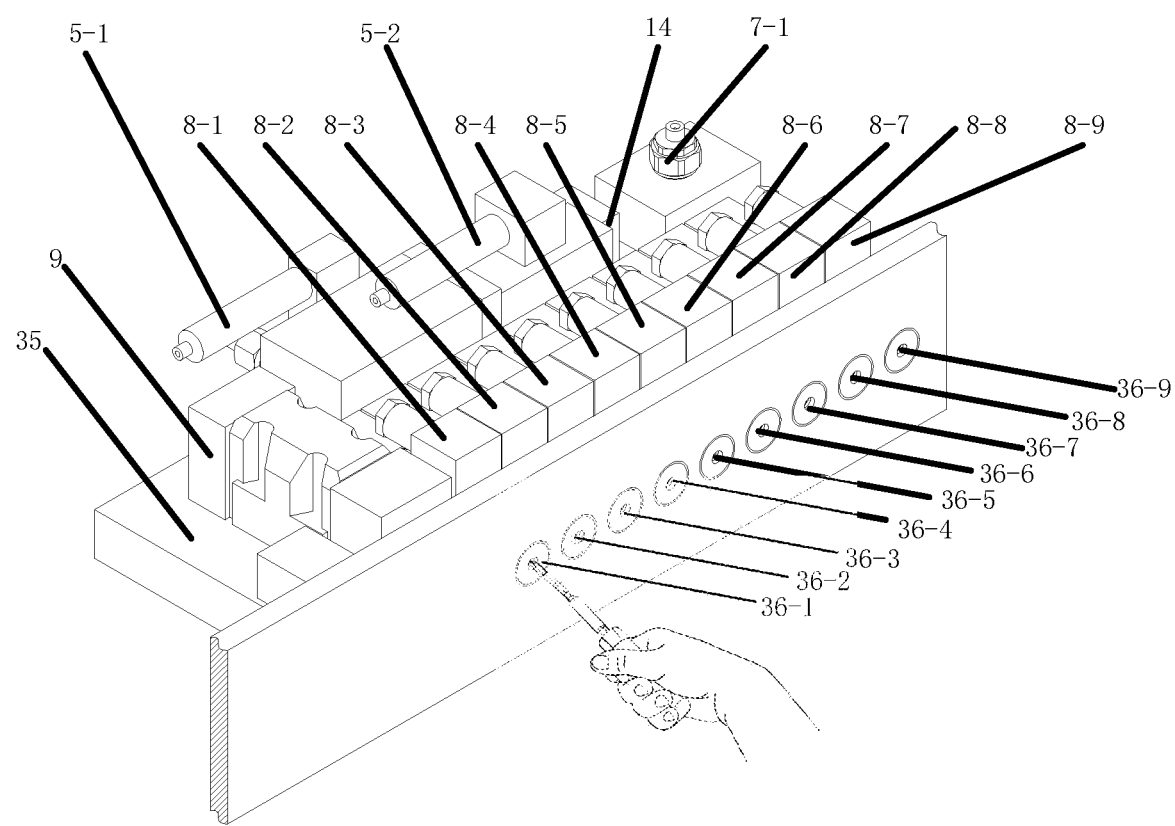
FIG. 7 is a schematic diagram of manual operations of the electromagnetic reversing valves in the present disclosure.

As shown in FIG. 3, the two-position four-way electromagnetic reversing valve group 8 configured to control basic actions of the rapid mooring device 22 includes the first electromagnetic reversing valve 8-1, the second electromagnetic reversing valve 8-2, the third electromagnetic reversing valve 8-3, the fourth electromagnetic reversing valve 8-4, the fifth electromagnetic reversing valve 8-5, the sixth electromagnetic reversing valve 8-6, the seventh electromagnetic reversing valve 8-7, the eighth electromagnetic reversing valve 8-8, and the ninth electromagnetic reversing valve 8-9 same in model; the two-position four-way electromagnetic reversing valve group 8 an integrated design to be parallelly connected to a same valve block 35 of a control valve, and manual buttons of the nine electromagnetic reversing valves are parallelly exposed out of a side wall on a rear side of the rapid mooring device 22, so that a worker conveniently performs a manual emergency operation on the buttons of the electromagnetic reversing valves in emergency states such as power failure to complete the basic actions of capturing and releasing the helicopter; and the buttons of the electromagnetic reversing valves include a first button 36-1 controlling the first electromagnetic reversing valve 8-1, a second button 36-2 controlling the second electromagnetic reversing valve 8-2, a third button 36-3 controlling the third electromagnetic reversing valve 8-3, a fourth button 36-4 controlling the fourth electromagnetic reversing valve 8-4, a fifth button 36-5 controlling the fifth electromagnetic reversing valve 8-5, a sixth button 36-6 controlling the sixth electromagnetic reversing valve 8-6, a seventh button 36-7 controlling the seventh electromagnetic reversing valve 8-7, an eighth button 36-8 controlling the eighth electromagnetic reversing valve 8-8, and a ninth button 36-9 controlling the ninth electromagnetic reversing valve 8-9.

To reliably recycle and fly the helicopter, a control method for the hydraulic system for a rapid mooring device of an offshore operation helicopter includes a routine action control method for the rapid mooring device 22, a safety protection control method, an emergency action control method and the like.

EMBODIMENT

The embodiment of the present disclosure provides a control method for the hydraulic system for a rapid mooring device of an offshore operation helicopter, including a routine action control method for the rapid mooring device, a safety protection control method and an emergency action control method.

The routine action control method for the rapid mooring device 22 includes: a control method for rapidly capturing a probe rod 23 of the helicopter, a control method for transversely straightening the helicopter in a process of pulling the helicopter to come in and go out of a hangar, a control method for straightening the helicopter at the center in a process of pulling the helicopter to go out of the hangar, a control method for rapidly releasing the probe rod 23 of the helicopter, a control method for transversely and hydraulically locking the probe rod 23 of the helicopter and a control method for transversely and mechanically locking the probe rod 23 of the helicopter; in combination with FIG. 1-FIG. 7, the methods are specifically described below:

B1: the control method for rapidly capturing a probe rod 23 of the helicopter includes the following steps:

B1.1: the fifth electromagnetic reversing valve 8-5 is electrified, the mechanical claw unlocking cylinder 18 retracts, a locking pin 30 of a mechanical claw is driven by a connecting rod mechanism to retreat downwards, and an upper claw 32 of the mechanical claw 26 is opened under an elastic action;

B1.2: the sixth electromagnetic reversing valve 8-6 is electrified, the centering lock unlocking cylinder 19 stretches out, and a lock pin 27 of a centering lock is driven by the connecting rod mechanism to retract;

B1.3: the ninth electromagnetic reversing valve 8-9 is electrified, the emergency lock unlocking cylinder 20 stretches out, and lock pins of all emergency locks are driven by the connecting rod mechanism to retract;

the lock pins of the emergency locks include a lock pin 28-1 of the first emergency lock, a lock pin 28-2 of the second emergency lock, a lock pin 28-3 of the third emergency lock, a lock pin 28-4 of the fourth emergency lock, a lock pin 28-5 of the fifth emergency lock, a lock pin 28-6 of the sixth emergency lock, a lock pin 28-7 of the seventh emergency lock, a lock pin 28-8 of the eighth emergency lock, a lock pin 28-9 of the ninth emergency lock and a lock pin 28-10 of the tenth emergency lock;

B1.4: the eighth electromagnetic reversing valve 8-8 is electrified, the externally controlled large flow hydraulic lock 12 is unlocked, and two cavities of the thick hydraulic cylinder 17-1 are communicated with the fuel tank 1, so that the thick hydraulic cylinder 17-1 floats;

B1.5: the third electromagnetic reserving valve 8-3 and the fourth electromagnetic reserving valve 8-4 both are in a power-off state, so that the stacked internally controlled hydraulic lock 11 is locked, and contact between the thick hydraulic cylinder 17-1 and the load oilway is cut-off;

B1.6: the seventh electromagnetic reversing valve 8-7 is electrified, the cartridge valve 14 is conducted, and the energy accumulator 15 supplies oil to the load oilway; and B1.7: the first electromagnetic reversing valve 8-1 and the second electromagnetic reversing valve 8-2 are powered off, a rod cavity of the thin hydraulic cylinder 17-2 is controlled to feed oil and a rodless cavity thereof is controlled to return oil through the three-position four-way Y type hydraulically operated reversing valve 9, the thin hydraulic cylinder 17-2 drives the thick hydraulic cylinder 17-1 to retract rapidly and synchronously, the opened mechanical claw 26 is driven by a left chain 33-1, a right chain 33-2 and a speed increasing pulley block to move rapidly, and the probe rod 23 of the helicopter pushes the upper claw 32 of the mechanical claw to rotate till the upper claw 32 of the mechanical claw contacts with the probe rod 23 of the helicopter, so that the upper claw 32 of the mechanical claw and a lower claw 31 of the mechanical claw are closed, and the locking pin 30 of the mechanical claw is lifted upwards under the action of a twisting force of a square shaft spring to lock the upper claw 32 of the mechanical claw, so as to capture and lock the probe rod 23 of the helicopter;

B2: the control method for transversely straightening the helicopter in a process of pulling the helicopter to come in and go out of a hangar includes a control method for straightening the helicopter towards a starboard and a control method for straightening the helicopter towards a larboard:

B2.1: the control method for straightening the helicopter towards a starboard includes the following steps:

B2.1.1: the fifth electromagnetic reversing valve 8-5 is powered off, and the mechanical claw unlocking cylinder 18 stretches out to prevent the mechanical claw 26 from being opened;

B2.1.2: the sixth electromagnetic reversing valve 8-6 is electrified, the centering lock unlocking cylinder 19 stretches out, and the lock pin 27 of the centering lock is driven by the connecting rod mechanism to retract;

B2.1.3: the ninth electromagnetic reversing valve 8-9 is electrified, the emergency lock unlocking cylinder 20 stretches out, and lock pins of the emergency locks are driven by the connecting rod mechanism to retract;

B2.1.4: the eighth electromagnetic reversing valve 8-8 is powered off, and the externally controlled large flow hydraulic lock 12 is closed;

B2.1.5: the seventh electromagnetic reversing valve 8-7 is powered off, the cartridge valve 14 is closed, and the actions of the thick and thin hydraulic cylinders are only driven by the hydraulic pump 2;

B2.1.6: the first electromagnetic reversing valve 8-1 and the second electromagnetic reversing valve 8-2 both are powered off, the three-position four-way Y type hydraulically operated reversing valve 9 is controlled to be located at the center, the rod cavity and the rodless cavity of the thin hydraulic cylinder 17-2 both are connected to the fuel tank 1, and the thin hydraulic cylinder 17-2 follows; and B2.1.7: the third electromagnetic reversing valve 8-3 and the fourth electromagnetic reversing valve 8-4 are electrified, the rod cavity of the thick hydraulic cylinder 17-1 is controlled to return oil and the rodless cavity thereof is controlled to feed oil through the stacked double throttle check valve 10 and the stacked internally controlled hydraulic lock 11, the thick hydraulic cylinder 17-1 drives the thin hydraulic cylinder 17-2 to stretch out synchronously, and the mechanical claw 26 is driven by the left chain 33-1, the right chain 33-2 and the speed increasing pulley block to generate a slow speed motion and a high output, so as to complete the operation of straightening the offshore operation helicopter towards the starboard in the process of pulling the helicopter to come in and go out of the hangar;

B2.2: the control method for straightening the helicopter towards a larboard includes the following steps:

B2.2.1: the fifth electromagnetic reversing valve 8-5 is powered off, and the mechanical claw unlocking cylinder 18 stretches out to prevent the mechanical claw 26 from being opened;

B2.2.2: the sixth electromagnetic reversing valve 8-6 is electrified, the centering lock unlocking cylinder 19 stretches out, and the lock pin 27 of the centering lock is driven by the connecting rod mechanism to retract;

B2.2.3: the ninth electromagnetic reversing valve 8-9 is electrified, the emergency lock unlocking cylinder 20 stretches out, and lock pins of all emergency locks are driven by the connecting rod mechanism to retract;

B2.2.4: the eighth electromagnetic reversing valve 8-8 is powered off, and the externally controlled large flow hydraulic lock 12 is closed;

B2.2.5: the seventh electromagnetic reversing valve 8-7 is powered off, the cartridge valve 14 is closed, and the actions of the thick and thin hydraulic cylinders are only driven by the hydraulic pump 2;

B2.2.6: the first electromagnetic reversing valve 8-1 and the second electromagnetic reversing valve 8-2 are powered off, the three-position four-way Y type hydraulically operated reversing valve 9 is controlled to be located in a left position, the rod cavity of the thin hydraulic cylinder 17-2 feeds oil and the rodless cavity thereof returns oil, and the thin hydraulic cylinder 17-2 retracts; and B2.2.7: the third electromagnetic reversing valve 8-3 and the fourth electromagnetic reversing valve 8-4 are powered off, the rod cavity of the thick hydraulic cylinder 17-1 is controlled to feed oil and the rodless cavity thereof is controlled to return oil through the stacked double throttle check valve 10 and the stacked internally controlled hydraulic lock 11, the thick hydraulic cylinder 17-1 and the thin hydraulic cylinder 17-2 retract together, and the mechanical claw 26 is driven by the left chain 33-1, the right chain 33-2 and the speed increasing pulley block to generate the slow speed motion and the high output, so as to complete the operation of straightening the offshore operation helicopter towards the larboard in the process of pulling the helicopter to come in and go out of the hangar;

B3: the control method for straightening the helicopter at the center in a process of pulling the helicopter to go out of the hangar includes the following steps:

B3.1: the fifth electromagnetic reversing valve 8-5 is powered off, and the mechanical claw unlocking cylinder 18 stretches out to prevent the mechanical claw 26 from being opened;

B3.2: the sixth electromagnetic reversing valve 8-6 is powered off, the centering lock unlocking cylinder 19 retracts, and the lock pin 27 of the centering lock is driven by the connecting rod mechanism to stretch out;

B3.3: the ninth electromagnetic reversing valve 8-9 is electrified, the emergency lock unlocking cylinder 20 stretches out, and lock pins of all emergency locks are driven by the connecting rod mechanism to retract;

B3.4: the mechanical claw 26 grabbing the probe rod is adjusted to move towards a center line of the rapid mooring device 22 according to the straightening steps of B2.1.4-B2.1.7 or B2.2.4-B2.2.7; when a center line of the mechanical claw 26 is aligned with a center line of the lock pin of the centering lock, the lock pin 27 of the centering lock will be inserted into a cotter way on a back side of the mechanical claw 26, and the mechanical claw 26 is clamped in a transverse middle position of the rapid mooring device 22, so that in the process of pulling the rapid mooring device 22 to go out of the hangar by a traction winch 21, the probe rod 23 of the helicopter travels along a center line of a track on a deck all the time, and the helicopter will be automatically straightened to an appropriate posture while being dragged to move along the track;

B4: the control method for rapidly releasing a probe rod 23 of the helicopter includes the following steps:

B4.1: the fifth electromagnetic reversing valve 8-5 is powered off, the mechanical claw unlocking cylinder 18 retracts, the locking pin 30 of the mechanical claw is driven by the connecting rod mechanism to retreat downwards, and the upper claw 32 of the mechanical claw is opened under the elastic action to release the probe rod 23 of the helicopter;

B4.2: the sixth electromagnetic reversing valve 8-6 is electrified, the centering lock unlocking cylinder 19 stretches out, and the lock pin 27 of the centering lock is driven by the connecting rod mechanism to retract;

B4.3: the ninth electromagnetic reversing valve 8-9 is electrified, the emergency lock unlocking cylinder 20 stretches out, and lock pins of all emergency locks are driven by the connecting rod mechanism to retract;

B4.4: the eighth electromagnetic reversing valve 8-8 is electrified, the externally controlled large flow hydraulic lock 12 is unlocked, and two cavities of the thick hydraulic cylinder 17-1 are communicated with the fuel tank, so that the thick hydraulic cylinder 17-1 is in a floating state;

B4.5: the third electromagnetic reserving valve 8-3 and the fourth electromagnetic reserving valve 8-4 both are in a power-off, so that the stacked internally controlled hydraulic lock 11 is locked, and contact between the thick hydraulic cylinder 17-1 and the load oilway is cut-off;

B4.6: the seventh electromagnetic reversing valve 8-7 is electrified, the cartridge valve 14 is conducted, and the energy accumulator 15 supplies oil to the load oilway; and B4.7: the first electromagnetic reversing valve 8-1 is powered off and the second electromagnetic reversing valve 8-2 is electrified, the rod cavity of the thin hydraulic cylinder 17-2 is controlled to return oil and the rodless cavity thereof is controlled to feed oil through the three-position four-way Y type hydraulically operated reversing valve 9, the thin hydraulic cylinder 17-2 drives the thick hydraulic cylinder 17-1 to stretch out rapidly and synchronously, the mechanical claw 26 is driven by the left chain 33-1, the right chain 33-2 and the speed increasing pulley block to leave the probe rod 23 of the helicopter rapidly and stops till it returns to an initial position for waiting for next capture;

B5: the control method for transversely and mechanically locking the probe rod 23 of the helicopter includes the following steps:

B5.1: the sixth electromagnetic reversing valve 8-6 is powered off, the centering lock unlocking cylinder 19 retracts, and the lock pin 27 of the centering lock is driven by the connecting rod mechanism to stretch out;

B5.2: the ninth electromagnetic reversing valve 8-9 is powered off, the emergency lock unlocking cylinder 20 retracts, and lock pins of all emergency locks are driven by the connecting rod mechanism to stretch out;

B5.3: when the mechanical claw 26 is driven by an external force or an internal force to move to a middle position between any two adjacent emergency locks, the mechanical claw 26 will be clamped between the two adjacent emergency locks; and when the mechanical claw 26 moves till a center line thereof is aligned with a center line of the centering lock, the lock pin 27 of the centering lock will be inserted into a cotter way of the centering lock on the back of the lower claw 31 of the mechanical claw, so that the mechanical claw 26 is clamped in the transverse middle position of the rapid mooring device 22 and cannot move; and B6: the control method for transversely and hydraulically locking the probe rod 23 of the helicopter includes the following steps:

B6.1: the eighth electromagnetic reversing valve 8-8, the third electromagnetic reversing valve 8-3 and the fourth electromagnetic reversing valve 8-4 are powered off, the stacked internally controlled hydraulic lock 11 and the externally controlled large flow hydraulic lock 12 are controlled to be locked to lock oilways of the rodless cavity and the rod cavity of the thick hydraulic cylinder 17-1 by means of joint action, and the mechanical claw 26 is forcibly and hydraulically locked in a current position; and The setting diagram of the electromagnetic reversing valves of routine actions is shown in FIG. 6.

the safety protection method includes: a power off routine protection method, an overload protection method, a chain fracture protection method, a safe mooring method after capture of the helicopter and an alarm method for filter clogging;

S1: the power off routine protection method includes the following steps:

S1.1: after the rapid mooring device 22 is powered off, the third electromagnetic reversing valve 8-3, the fourth electromagnetic reversing valve 8-4 and the eighth electromagnetic reversing valve 8-8 all are powered off, resulting in lock of the stacked internally controlled hydraulic lock 11 and the externally controlled large flow hydraulic lock 12, so that the oilways of the two cavities of the thick hydraulic cylinder 17-1 are locked, and the mechanical claw 26 is hydraulically locked transversely and cannot move; and S1.2: after the rapid mooring device 22 is powered off, the ninth electromagnetic reversing valve 8-9 and the sixth electromagnetic reversing valve 8-6 both are powered off, the emergency lock unlocking cylinder 20 and the centering lock unlocking cylinder 19 retract under the action of a spring force, and the lock pin 27 of the centering lock and the lock pin of the emergency lock both are driven by the connecting rod mechanism to stretch out; under a condition that the hydraulic lock in S1.1 cannot be completely locked, if the mechanical claw 26 moves continuously, the mechanical claw will be mechanically locked between two adjacent transverse emergency locks or will be mechanically locked in the transverse middle position of the rapid mooring device 22 by the centering lock, so that the operation safety of the offshore operation helicopter is further improved;

S2: the overload protection method includes the following steps:

in the processes of mooring, pulling and straightening the helicopter, when a load face applied by the probe rod 23 of the helicopter to the mechanical claw 26 exceeds active power outputted by a hydraulic system due to force majeure, the stacked internally controlled hydraulic lock 11 and the externally controlled large flow hydraulic lock 12 will be automatically locked; the oilways of the two cavities of the thick hydraulic cylinder 17-1 will be locked; and positions of the left chain 33-1, the right chain 33-2 and the mechanical claw 26 will be locked;

S3: the chain fracture protection method includes the following steps:

when the left chain 33-1 or the right chain 33-2 ruptures, a chain rupture alarm sensor 29 will transmits a chain rupture alarm signal to an upper computer; the upper computer will give a command of "mechanically locking the probe rod of the helicopter" to a rapid mooring device controller 34; after the abovementioned step B5 is executed, the lock pin 27 of the centering lock and the lock pins of all the emergency locks stretch out, and if the mechanical claw moves continuously, the mechanical claw 26 will be mechanically locked between two adjacent transverse emergency locks by the lock pins of the emergency locks or will be mechanically locked in the transverse middle position of the rapid mooring device 22 by the lock pin of the centering lock;

S4: the safe mooring method after capture of the helicopter includes the following steps:

after the abovementioned step B1 is executed, the mechanical claw 26 stops moving and moors the helicopter in a fixed position; when the system works normally, the helicopter is moored by step B5 or B6; and when the system is subjected to power off, overload or chain rupture failure, the helicopter is moored by steps S1, S2 and S3; and S5: the alarm method for filter clogging includes the following steps:

in a process of feeding oil to the energy accumulator 15 by the hydraulic pump 2, a pressure difference value between the first pressure sensor 5-1 and the second pressure sensor 5-2 is detected, and when the pressure difference value exceeds a preset alarm threshold of filter clogging, the rapid mooring device controller 34 will give an alarm signal to the upper controller; and the emergency action control method includes: a basic action control method using the energy accumulator as a standby power source and a basic action control method using high pressure air as the standby power source;

E1: the basic action control method using the energy accumulator as a standby power source includes the following steps:

under a condition that the hydraulic system is just powered off, the pressure of oil stored by the energy accumulator 15 is greater than or equal to the minimum threshold pressure of the energy accumulator, so that the rapid mooring device 22 can complete a plurality of cycles of actions of capturing and releasing the probe rod of the helicopter; by means of the basic action control method for the rapid mooring device 22 in Steps B1-B6, the actions of capturing and releasing the probe rod of the helicopter by the rapid mooring device 22 can be completed by way of manually pushing setting buttons of the electromagnetic reversing valves replacing electrification of corresponding electromagnetic reversing valves; and E2: the basic action control method using high pressure air as the standby power source includes the following steps:

after the rapid mooring device 22 is powered off and energy stored in the energy accumulator 15 is exhausted, a hose of compressed air for ship is connected to an air input port of a pneumatic hydraulic pump 16 of the rapid mooring device 22, the pneumatic hydraulic pump 16 can fill a liquid to the energy accumulator 15 to reach a working pressure of the rapid mooring device 22; the subsequent operating method is the same as E1, and the actions of capturing and releasing the probe rod of the helicopter by the rapid mooring deice 22 can be completed by way of manually pushing setting buttons of the electromagnetic reversing valves replacing electrification of corresponding electromagnetic reversing valves.

What is claimed is:

1. A hydraulic system for a rapid mooring device of an offshore operation helicopter, comprising a fuel tank, a hydraulic pump, an electric motor, a first check valve, a second check valve, a first pressure sensor, a second pressure sensor, a first filter, a second filter, a first overflow valve, a second overflow valve, a two-position four-way electromagnetic reversing valve group, a three-position four-way Y-type hydraulically operated reversing valve, a stacked double throttle check valve, a stacked internally controlled hydraulic lock, an externally controlled large flow hydraulic lock, a first safety valve, a second safety valve, a cartridge valve, an energy accumulator, a pneumatic hydraulic pump, a thick and thin parallel single rod hydraulic cylinder, a mechanical claw unlocking cylinder, a centering lock unlocking cylinder, and an emergency lock unlocking cylinder, wherein the thick and thin parallel single rod hydraulic cylinder comprises a thick hydraulic cylinder and a thin hydraulic cylinder;

in oilways of the hydraulic system, an oilway connected to a port A of the cartridge valve is called as a load oilway; and an oilway connected to a port B of the cartridge valve is called as an energy accumulating oilway;

the hydraulic pump is connected to the load oilway through the first check valve and the first filter; and the first pressure sensor is connected to an oilway between the first check valve and the first filter;

the pneumatic hydraulic pump is connected to the energy accumulating oilway through the second check valve and the second filter; and the second pressure sensor is connected to an outlet oilway of the second filter;

the first overflow valve and the second overflow valve are respectively connected to the load oilway and the energy accumulating oilway to prevent pressures of the oilways from exceeding a preset valve, so as to protect safety of the oilways;

the thick hydraulic cylinder is connected to the load oilway through the stacked internally controlled hydraulic lock, the stacked double throttle check valve, a third electromagnetic reversing valve and a fourth electromagnetic reversing valve; ports A and B of the thick hydraulic cylinder are respectively connected to ports A of the third electromagnetic reversing valve and the fourth electromagnetic reversing valve through oilways on sides A and B of the stacked double throttle check valve and the stacked internally controlled hydraulic lock; ports P and T of the third electromagnetic reversing valve and the fourth electromagnetic reversing valve are respectively connected to the load oilway and the fuel tank; ports A and B of the thick hydraulic cylinder are respectively connected to the fuel tank through oilways on sides A and B of the externally controlled large flow hydraulic lock and are further connected to the fuel tank through the first safety valve and the second safety valve; control oilways on sides A and B of the externally controlled large flow hydraulic lock are uniformly connected to a port A of an eighth electromagnetic reversing valve, and ports P and T of the eighth electromagnetic reversing valve are respectively connected to the energy accumulating oilway and the fuel tank;

the thin hydraulic cylinder is connected to the load oilway through the three-position four-way Y type hydraulically operated reversing valve, the first electromagnetic reversing valve and the second electromagnetic reversing valve; ports A and B of the thin hydraulic cylinder are respectively connected to ports A and B of the three-position four-way Y type hydraulically operated reversing valve; ports A of the first electromagnetic reversing valve and the second electromagnetic reversing valve are respectively connected to left and right hydraulically controlled oilways of the three-position four-way Y type hydraulically operated reversing valve; and ports P and T of the three-position four-way Y type hydraulically operated reversing valve, the first electromagnetic reversing valve and the second electromagnetic reversing valve are respectively connected to the load oilway and the fuel tank;

a port A of the mechanical claw unlocking cylinder is connected to a port A of a fifth electromagnetic reversing valve; and ports P and T of the fifth electromagnetic reversing valve are respectively connected to the load oilway and the fuel tank;

ports A of the centering lock unlocking cylinder and the emergency lock unlocking cylinder are connected to ports A of a sixth electromagnetic reversing valve and a ninth electromagnetic reversing valve; and ports P and T of the sixth electromagnetic reversing valve and the ninth electromagnetic reversing valve are respectively connected to the energy accumulating oilway and the fuel tank; and ports A and B of the cartridge valve are respectively connected to the load oilway and the energy accumulating oilway; and a control oilway of the cartridge valve is connected to a port B of a seventh electromagnetic reversing valve, and ports P and T of the seventh electromagnetic reversing valve are respectively connected to the energy accumulating oilway and the fuel tank.

2. The hydraulic system according to claim 1, wherein the pressure of the energy accumulating oilway is between a minimum threshold pressure and a maximum threshold pressure; when the pressure of the energy accumulating oilway sensed by the second pressure sensor is smaller than the minimum threshold pressure of the energy accumulator, the hydraulic pump starts work to fill oil for the energy accumulator; and when the pressure of the energy accumulating oilway sensed is greater than or equal to the maximum threshold pressure of the energy accumulator, the hydraulic pump stops working.

3. The hydraulic system according to claim 1, wherein the ports P and T of the sixth electromagnetic reversing valve, the seventh electromagnetic reversing valve, the eighth electromagnetic reversing valve and the ninth electromagnetic reversing valve are respectively connected to the energy accumulating oilway and the fuel tank, so as to guarantee that the energy accumulator, the centering lock unlocking cylinder, the emergency lock unlocking cylinder and the externally controlled large flow hydraulic lock are not affected by the pressure of the load oilway.

4. The hydraulic system according to claim 1, wherein the two-position four-way electromagnetic reversing valve block configured to control basic actions of the rapid mooring device comprises the first electromagnetic reversing valve, the second electromagnetic reversing valve, the third electromagnetic reversing valve, the fourth electromagnetic reversing valve, the fifth electromagnetic reversing valve, the sixth electromagnetic reversing valve, the seventh electromagnetic reversing valve, the eighth electromagnetic reversing valve, and the ninth electromagnetic reversing valve same in model; the two-position four-way electromagnetic reversing valve block adopts an integrated design to be parallelly connected to a same valve block of a control valve, and manual buttons of the nine electromagnetic reversing valves are parallelly exposed out of a side wall on a rear side of the rapid mooring device, so that a worker conveniently performs a manual emergency operation on the buttons of the electromagnetic reversing valves in emergency states such as power failure to complete the basic actions of capturing and releasing the helicopter; and the buttons of the electromagnetic reversing valves comprise a first button controlling the first electromagnetic reversing valve, a second button controlling the second electromagnetic reversing valve, a third button controlling the third electromagnetic reversing valve, a fourth button controlling the fourth electromagnetic reversing valve, a fifth button controlling the fifth electromagnetic reversing valve, a sixth button controlling the sixth electromagnetic reversing valve, a seventh button controlling the seventh electromagnetic reversing valve, an eighth button controlling the eighth electromagnetic reversing valve, and a ninth button controlling the ninth electromagnetic reversing valve.

5. A control method for the hydraulic system according to claim 1, comprising a routine action control method for the rapid mooring device, a safety protection control method and an emergency action control method, wherein the routine action control method for the rapid mooring device comprises: a control method for rapidly capturing a probe rod of the helicopter, a control method for transversely straightening the helicopter in a process of pulling the helicopter to come in and go out of a hangar, a control method for straightening the helicopter at the center in a process of pulling the helicopter to go out of the hangar, a control method for rapidly releasing the probe rod of the helicopter, a control method for transversely and hydraulically locking the probe rod of the helicopter and a control method for transversely and mechanically locking the probe rod of the helicopter;

B1: the control method for rapidly capturing a probe rod of the helicopter comprises the following steps:

B1.1: electrifying the fifth electromagnetic reversing valve, retracting the mechanical claw unlocking cylinder, driving a locking pin of a mechanical claw by a connecting rod mechanism to retreat downwards, and opening an upper claw of the mechanical claw under an elastic action;

B1.2: electrifying the sixth electromagnetic reversing valve, stretching out the centering lock unlocking cylinder, and driving a lock pin of a centering lock by the connecting rod mechanism to retract;

B1.3: electrifying the ninth electromagnetic reversing valve, stretching out the emergency lock unlocking cylinder, and driving lock pins of all emergency locks by the connecting rod mechanism to retract;

B1.4: electrifying the eighth electromagnetic reversing valve, unlocking the externally controlled large flow hydraulic lock, and communicating two cavities of the thick hydraulic cylinder with the fuel tank, wherein the thick hydraulic cylinder floats;

B1.5: the third electromagnetic reserving valve and the fourth electromagnetic reserving valve both being in a power-off state, locking the stacked internally controlled hydraulic lock, and cutting off contact between the thick hydraulic cylinder and the load oilway;

B1.6: electrifying the seventh electromagnetic reversing valve, conducting the cartridge valve, and supplying, by the energy accumulator, oil to the load oilway; and B1.7: the first electromagnetic reversing valve and the second electromagnetic reversing valve being powered off, controlling a rod cavity of the thin hydraulic cylinder to feed oil and controlling a rodless cavity thereof to return oil through the three-position four-way Y type hydraulically operated reversing valve, driving, by the thin hydraulic cylinder, the thick hydraulic cylinder to retract rapidly and synchronously, driving, by a left chain, a right chain and a speed increasing pulley block, the opened mechanical claw to move rapidly, and pushing, by the probe rod of the helicopter, the upper claw of the mechanical claw to rotate till the upper claw of the mechanical claw contacts with the probe rod of the helicopter, closing the upper claw of the mechanical claw and a lower claw of the mechanical claw, and lifting the locking pin of the mechanical claw upwards under the action of a twisting force of a square shaft spring to lock the upper claw of the mechanical claw, so as to capture and lock the probe rod of the helicopter;

B2: the control method for transversely straightening the helicopter in a process of pulling the helicopter to come in and go out of a hangar comprises a control method for straightening the helicopter towards a starboard and a control method for straightening the helicopter towards a larboard:

B2.1: the control method for straightening the helicopter towards a starboard comprises the following steps:

B2.1.1: powering off the fifth electromagnetic reversing valve, and stretching out the mechanical claw unlocking cylinder to prevent the mechanical claw from being opened;

B2.1.2: electrifying the sixth electromagnetic reversing valve, stretching out the centering lock unlocking cylinder, and driving, by the connecting rod mechanism, the lock pin of the centering lock to retract;

B2.1.3: electrifying the ninth electromagnetic reversing valve, stretching out the emergency lock unlocking cylinder, and driving, by the connecting rod mechanism, lock pins of the emergency locks to retract;

B2.1.4: powering off the eighth electromagnetic reversing valve, and locking the externally controlled large flow hydraulic lock;

B2.1.5: powering off the seventh electromagnetic reversing valve, closing the cartridge valve, and driving, only by the hydraulic pump, the actions of the thick and thin hydraulic cylinders;

B2.1.6: powering off both the first electromagnetic reversing valve and the second electromagnetic reversing valve, controlling the three-position four-way Y type hydraulically operated reversing valve to be located at the center, connecting both the rod cavity and the rodless cavity of the thin hydraulic cylinder to the fuel tank, wherein the thin hydraulic cylinder follows; and B2.1.7: electrifying the third electromagnetic reversing valve and the fourth electromagnetic reversing valve, controlling the rod cavity of the thick hydraulic cylinder to return oil and controlling the rodless cavity thereof to feed oil through the stacked double throttle check valve and the stacked internally controlled hydraulic lock, driving, by the thick hydraulic cylinder, the thin hydraulic cylinder to stretch out synchronously, and driving, by by the left chain, the right chain and the speed increasing pulley block, the mechanical claw to generate a slow speed motion and a high output, so as to complete the operation of straightening the offshore operation helicopter towards the starboard in the process of pulling the helicopter to come in and go out of the hangar;

B2.2: the control method for straightening the helicopter towards a larboard comprises the following steps:

B2.2.1: powering off the fifth electromagnetic reversing valve, and stretching out the mechanical claw unlocking cylinder to prevent the mechanical claw from being opened;

B2.2.2: electrifying the sixth electromagnetic reversing valve, stretching out the centering lock unlocking cylinder, and driving, by the connecting rod mechanism, the lock pin of the centering lock to retract;

B2.2.3: electrifying the ninth electromagnetic reversing valve, stretching out the emergency lock unlocking cylinder, and driving, by the connecting rod mechanism, lock pins of all emergency locks to retract;

B2.2.4: powering off the eighth electromagnetic reversing valve, and locking the externally controlled large flow hydraulic lock;

B2.2.5: powering off the seventh electromagnetic reversing valve, closing the cartridge valve, and driving, only by the hydraulic pump, the actions of the thick and thin hydraulic cylinders;

B2.2.6: powering off the first electromagnetic reversing valve and the second electromagnetic reversing valve, controlling the three-position four-way Y type hydraulically operated reversing valve to be located in a left position, feeding, by the rod cavity of the thin hydraulic cylinder, oil and returning, by the rodless cavity thereof, oil, and retracting the thin hydraulic cylinder; and B2.2.7: powering off the third electromagnetic reversing valve and the fourth electromagnetic reversing valve, controlling the rod cavity of the thick hydraulic cylinder to feed oil and controlling the rodless cavity thereof to return oil through the stacked double throttle check valve and the stacked internally controlled hydraulic lock, retracting the thick hydraulic cylinder and the thin hydraulic cylinder together, and driving, by by the left chain, the right chain and the speed increasing pulley block, the mechanical claw to generate the slow speed motion and the high output, so as to complete the operation of straightening the offshore operation helicopter towards the larboard in the process of pulling the helicopter to come in and go out of the hangar;

B3: the control method for straightening the helicopter at the center in a process of pulling the helicopter to go out of the hangar comprises the following steps:

B3.1: powering off the fifth electromagnetic reversing valve, and stretching out the mechanical claw unlocking cylinder to prevent the mechanical claw from being opened;

B3.2: powering off the sixth electromagnetic reversing valve, retracting the centering lock unlocking cylinder, and driving, by the connecting rod mechanism, the lock pin of the centering lock to stretch out;

B3.3: electrifying the ninth electromagnetic reversing valve, stretching out the emergency lock unlocking cylinder, and driving, by the connecting rod mechanism, lock pins of all emergency locks to retract;

B3.4: adjusting the mechanical claw grabbing the probe rod to move towards a center line of the rapid mooring device according to the straightening steps of B2.1.4-B2.1.7 or B2.2.4-B2.2.7; when a center line of the mechanical claw is aligned with a center line of the lock pin of the centering lock, inserting the lock pin of the centering lock into a cotter way on a back side of the mechanical claw, and clamping the mechanical claw in a transverse middle position of the rapid mooring device, wherein in the process of pulling the rapid mooring device to go out of the hangar by a traction winch, the probe rod of the helicopter travels along a center line of a track on a deck all the time, and the helicopter will be automatically straightened to an appropriate posture while being dragged to move along the track;

B4: the control method for rapidly releasing a probe rod of the helicopter comprises the following steps:

B4.1: powering off the fifth electromagnetic reversing valve, retracting the mechanical claw unlocking cylinder, driving, by the connecting rod mechanism, the locking pin of the mechanical claw to retreat downwards, and opening the upper claw of the mechanical claw under the elastic action to release the probe rod of the helicopter;

B4.2: electrifying the sixth electromagnetic reversing valve, stretching out the centering lock unlocking cylinder, and driving, by by the connecting rod mechanism, the lock pin of the centering lock to retract;

B4.3: electrifying the ninth electromagnetic reversing valve, stretching out the emergency lock unlocking cylinder, and driving, by the connecting rod mechanism, lock pins of all emergency locks to retract;

B4.4: electrifying the eighth electromagnetic reversing valve, unlocking the externally controlled large flow hydraulic lock, and communicating two cavities of the thick hydraulic cylinder with the fuel tank, wherein the thick hydraulic cylinder is in a floating state;

B4.5: powering off both the third electromagnetic reserving valve and the fourth electromagnetic reserving valve, locking the stacked internally controlled hydraulic lock, and cutting off contact between the thick hydraulic cylinder and the load oilway;

B4.6: electrifying the seventh electromagnetic reversing valve, conducting the cartridge valve, and supplying, by the energy accumulator, oil to the load oilway; and B4.7: powering off the first electromagnetic reversing valve and electrifying the second electromagnetic reversing valve, controlling the rod cavity of the thin hydraulic cylinder to return oil and controlling the rodless cavity thereof to feed oil through the three-position four-way Y type hydraulically operated reversing valve, driving, by the thin hydraulic cylinder, the thick hydraulic cylinder to stretch out rapidly and synchronously, driving, by the left chain, the right chain and the speed increasing pulley block, the mechanical claw to leave the probe rod of the helicopter rapidly and stops till the mechanical claw returns to an initial position for waiting for next capture;

B5: the control method for transversely and mechanically locking the probe rod of the helicopter comprises the following steps:

B5.1: powering off the sixth electromagnetic reversing valve, retracting the centering lock unlocking cylinder, and driving, by the connecting rod mechanism, the lock pin of the centering lock to stretch out;

B5.2: powering off the ninth electromagnetic reversing valve, retracting the emergency lock unlocking cylinder, and driving, by the connecting rod mechanism, lock pins of all emergency locks to stretch out;

B5.3: when the mechanical claw is driven by an external force or an internal force to move to a middle position between any two adjacent emergency locks, clamping the mechanical claw between the two adjacent emergency locks; and when the mechanical claw moves till a center line thereof is aligned with a center line of the centering lock, inserting the lock pin of the centering lock into a cotter way of the centering lock on the back of the lower claw of the mechanical claw, wherein the mechanical claw is clamped in the transverse middle position of the rapid mooring device and cannot move; and B6: the control method for transversely and hydraulically locking the probe rod of the helicopter comprises the following steps:

B6.1: powering off the eighth electromagnetic reversing valve, the third electromagnetic reversing valve and the fourth electromagnetic reversing valve, controlling the stacked internally controlled hydraulic lock and the externally controlled large flow hydraulic lock to be locked to lock oilways of the rodless cavity and the rod cavity of the thick hydraulic cylinder by means of joint action, and forcibly and hydraulically locking the mechanical claw in a current position; and the safety protection method comprises: a power off routine protection method, an overload protection method, a chain fracture protection method, a safe mooring method after capture of the helicopter and an alarm method for filter clogging;

S1: the power off routine protection method comprises the following steps:

S1.1: after powering off the rapid mooring device, powering off all the third electromagnetic reversing valve, the fourth electromagnetic reversing valve and the eighth electromagnetic reversing valve, resulting in lock of the stacked internally controlled hydraulic lock and the externally controlled large flow hydraulic lock, wherein the oilways of the two cavities of the thick hydraulic cylinder are locked, and the mechanical claw is hydraulically locked transversely and cannot move; and S1.2: after powering off the rapid mooring device, powering off both the ninth electromagnetic reversing valve and the sixth electromagnetic reversing valve, retracting the emergency lock unlocking cylinder and the centering lock unlocking cylinder under the action of a spring force, and driving, by the connecting rod mechanism, both the lock pin of the centering lock and the lock pin of the emergency lock to stretch out; under a condition that the hydraulic lock in S1.1 cannot be completely locked, if the mechanical claw moves continuously, mechanically locking the mechanical claw between two adjacent transverse emergency locks or mechanically locking the mechanical claw in the transverse middle position of the rapid mooring device by the centering lock, wherein the operation safety of the offshore operation helicopter is further improved;

S2: the overload protection method comprises the following steps:

in the processes of mooring, pulling and straightening the helicopter, when a load face applied by the probe rod of the helicopter to the mechanical claw exceeds active power outputted by a hydraulic system due to force majeure, automatically locking the stacked internally controlled hydraulic lock and the externally controlled large flow hydraulic lock; locking the oilways of the two cavities of the thick hydraulic cylinder; and locking positions of the left chain, the right chain and the mechanical claw;

S3: the chain fracture protection method comprises the following steps:

when the left chain or the right chain ruptures, transmitting, by a chain rupture alarm sensor, a chain rupture alarm signal to an upper computer; giving, by the upper computer, a command of "mechanically locking the probe rod of the helicopter" to a rapid mooring device controller; after executing the abovementioned step B5, stretching out the lock pin of the centering lock and the lock pins of all the emergency locks, and if the mechanical claw moves continuously, mechanically locking the mechanical claw between two adjacent transverse emergency locks by the lock pins of the emergency locks or mechanically locking the mechanical claw in the transverse middle position of the rapid mooring device by the lock pin of the centering lock;

S4: the safe mooring method after capture of the helicopter comprises the following steps:

after executing the abovementioned step B1, stopping moving the mechanical claw and mooring the helicopter in a fixed position; when the system works normally, mooring the helicopter by step B5 or B6; and when the system is subjected to power off, overload or chain rupture failure, mooring the helicopter by steps S1, S2 and S3; and S5: the alarm method for filter clogging comprises the following steps:

in a process of feeding oil to the energy accumulator by the hydraulic pump, detecting a pressure difference value between the first pressure sensor and the second pressure sensor, and when the pressure difference value exceeds a preset alarm threshold of filter clogging, giving, by the rapid mooring device controller, an alarm signal to the upper controller; and the emergency action control method comprises: a basic action control method using the energy accumulator as a standby power source and a basic action control method using high pressure air as the standby power source;

E1: the basic action control method using the energy accumulator as a standby power source comprises the following steps:

under a condition that the hydraulic system is just powered off, the pressure of oil stored by the energy accumulator is greater than or equal to the minimum threshold pressure of the energy accumulator, completing, by the rapid mooring device, a plurality of cycles of actions of capturing and releasing the probe rod of the helicopter; by means of the basic action control method for the rapid mooring device in steps B1-B6, completing, by the rapid mooring device, the actions of capturing and releasing the probe rod of the helicopter by way of manually pushing setting buttons of the electromagnetic reversing valves replacing electrification of corresponding electromagnetic reversing valves; and E2: the basic action control method using high pressure air as the standby power source comprises the following steps:

after the rapid mooring device is powered off and energy stored in the energy accumulator is exhausted, connecting a hose of compressed air for ship to an air input port of a pneumatic hydraulic pump of the rapid mooring device, filling, by the pneumatic hydraulic pump, a liquid to the energy accumulator to reach a working pressure of the rapid mooring device; the subsequent operating method is the same as E1, and completing, by the rapid mooring device, the actions of capturing and releasing the probe rod of the helicopter by way of manually pushing setting buttons of the electromagnetic reversing valves replacing electrification of corresponding electromagnetic reversing valves.

6. A control method for the hydraulic system according to claim 2, comprising a routine action control method for the rapid mooring device, a safety protection control method and an emergency action control method, wherein the routine action control method for the rapid mooring device comprises: a control method for rapidly capturing a probe rod of the helicopter, a control method for transversely straightening the helicopter in a process of pulling the helicopter to come in and go out of a hangar, a control method for straightening the helicopter at the center in a process of pulling the helicopter to go out of the hangar, a control method for rapidly releasing the probe rod of the helicopter, a control method for transversely and hydraulically locking the probe rod of the helicopter and a control method for transversely and mechanically locking the probe rod of the helicopter;

B1: the control method for rapidly capturing a probe rod of the helicopter comprises the following steps:

B1.1: electrifying the fifth electromagnetic reversing valve, retracting the mechanical claw unlocking cylinder, driving a locking pin of a mechanical claw by a connecting rod mechanism to retreat downwards, and opening an upper claw of the mechanical claw under an elastic action;

B1.2: electrifying the sixth electromagnetic reversing valve, stretching out the centering lock unlocking cylinder, and driving a lock pin of a centering lock by the connecting rod mechanism to retract;

B1.3: electrifying the ninth electromagnetic reversing valve, stretching out the emergency lock unlocking cylinder, and driving lock pins of all emergency locks by the connecting rod mechanism to retract;

B1.4: electrifying the eighth electromagnetic reversing valve, unlocking the externally controlled large flow hydraulic lock, and communicating two cavities of the thick hydraulic cylinder with the fuel tank, wherein the thick hydraulic cylinder floats;

B1.5: the third electromagnetic reserving valve and the fourth electromagnetic reserving valve both being in a power-off state, locking the stacked internally controlled hydraulic lock, and cutting off contact between the thick hydraulic cylinder and the load oilway;

B1.6: electrifying the seventh electromagnetic reversing valve, conducting the cartridge valve, and supplying, by the energy accumulator, oil to the load oilway; and B1.7: the first electromagnetic reversing valve and the second electromagnetic reversing valve being powered off, controlling a rod cavity of the thin hydraulic cylinder to feed oil and controlling a rodless cavity thereof to return oil through the three-position four-way Y type hydraulically operated reversing valve, driving, by the thin hydraulic cylinder, the thick hydraulic cylinder to retract rapidly and synchronously, driving, by a left chain, a right chain and a speed increasing pulley block, the opened mechanical claw to move rapidly, and pushing, by the probe rod of the helicopter, the upper claw of the mechanical claw to rotate till the upper claw of the mechanical claw contacts with the probe rod of the helicopter, closing the upper claw of the mechanical claw and a lower claw of the mechanical claw, and lifting the locking pin of the mechanical claw upwards under the action of a twisting force of a square shaft spring to lock the upper claw of the mechanical claw, so as to capture and lock the probe rod of the helicopter;

B2: the control method for transversely straightening the helicopter in a process of pulling the helicopter to come in and go out of a hangar comprises a control method for straightening the helicopter towards a starboard and a control method for straightening the helicopter towards a larboard:

B2.1: the control method for straightening the helicopter towards a starboard comprises the following steps:

B2.1.1: powering off the fifth electromagnetic reversing valve, and stretching out the mechanical claw unlocking cylinder to prevent the mechanical claw from being opened;

B2.1.2: electrifying the sixth electromagnetic reversing valve, stretching out the centering lock unlocking cylinder, and driving, by the connecting rod mechanism, the lock pin of the centering lock to retract;

B2.1.3: electrifying the ninth electromagnetic reversing valve, stretching out the emergency lock unlocking cylinder, and driving, by the connecting rod mechanism, lock pins of the emergency locks to retract;

B2.1.4: powering off the eighth electromagnetic reversing valve, and locking the externally controlled large flow hydraulic lock;

B2.1.5: powering off the seventh electromagnetic reversing valve, closing the cartridge valve, and driving, only by the hydraulic pump, the actions of the thick and thin hydraulic cylinders;

B2.1.6: powering off both the first electromagnetic reversing valve and the second electromagnetic reversing valve, controlling the three-position four-way Y type hydraulically operated reversing valve to be located at the center, connecting both the rod cavity and the rodless cavity of the thin hydraulic cylinder to the fuel tank, wherein the thin hydraulic cylinder follows; and B2.1.7: electrifying the third electromagnetic reversing valve and the fourth electromagnetic reversing valve, controlling the rod cavity of the thick hydraulic cylinder to return oil and controlling the rodless cavity thereof to feed oil through the stacked double throttle check valve and the stacked internally controlled hydraulic lock, driving, by the thick hydraulic cylinder, the thin hydraulic cylinder to stretch out synchronously, and driving, by by the left chain, the right chain and the speed increasing pulley block, the mechanical claw to generate a slow speed motion and a high output, so as to complete the operation of straightening the offshore operation helicopter towards the starboard in the process of pulling the helicopter to come in and go out of the hangar;

B2.2: the control method for straightening the helicopter towards a larboard comprises the following steps:

B2.2.1: powering off the fifth electromagnetic reversing valve, and stretching out the mechanical claw unlocking cylinder to prevent the mechanical claw from being opened;

B2.2.2: electrifying the sixth electromagnetic reversing valve, stretching out the centering lock unlocking cylinder, and driving, by the connecting rod mechanism, the lock pin of the centering lock to retract;

B2.2.3: electrifying the ninth electromagnetic reversing valve, stretching out the emergency lock unlocking cylinder, and driving, by the connecting rod mechanism, lock pins of all emergency locks to retract;

B2.2.4: powering off the eighth electromagnetic reversing valve, and locking the externally controlled large flow hydraulic lock;

B2.2.5: powering off the seventh electromagnetic reversing valve, closing the cartridge valve, and driving, only by the hydraulic pump, the actions of the thick and thin hydraulic cylinders;

B2.2.6: powering off the first electromagnetic reversing valve and the second electromagnetic reversing valve, controlling the three-position four-way Y type hydraulically operated reversing valve to be located in a left position, feeding, by the rod cavity of the thin hydraulic cylinder, oil and returning, by the rodless cavity thereof, oil, and retracting the thin hydraulic cylinder; and B2.2.7: powering off the third electromagnetic reversing valve and the fourth electromagnetic reversing valve, controlling the rod cavity of the thick hydraulic cylinder to feed oil and controlling the rodless cavity thereof to return oil through the stacked double throttle check valve and the stacked internally controlled hydraulic lock, retracting the thick hydraulic cylinder and the thin hydraulic cylinder together, and driving, by by the left chain, the right chain and the speed increasing pulley block, the mechanical claw to generate the slow speed motion and the high output, so as to complete the operation of straightening the offshore operation helicopter towards the larboard in the process of pulling the helicopter to come in and go out of the hangar;

B3: the control method for straightening the helicopter at the center in a process of pulling the helicopter to go out of the hangar comprises the following steps:

B3.1: powering off the fifth electromagnetic reversing valve, and stretching out the mechanical claw unlocking cylinder to prevent the mechanical claw from being opened;

B3.2: powering off the sixth electromagnetic reversing valve, retracting the centering lock unlocking cylinder, and driving, by the connecting rod mechanism, the lock pin of the centering lock to stretch out;

B3.3: electrifying the ninth electromagnetic reversing valve, stretching out the emergency lock unlocking cylinder, and driving, by the connecting rod mechanism, lock pins of all emergency locks to retract;

B3.4: adjusting the mechanical claw grabbing the probe rod to move towards a center line of the rapid mooring device according to the straightening steps of B2.1.4-B2.1.7 or B2.2.4-B2.2.7; when a center line of the mechanical claw is aligned with a center line of the lock pin of the centering lock, inserting the lock pin of the centering lock into a cotter way on a back side of the mechanical claw, and clamping the mechanical claw in a transverse middle position of the rapid mooring device, wherein in the process of pulling the rapid mooring device to go out of the hangar by a traction winch, the probe rod of the helicopter travels along a center line of a track on a deck all the time, and the helicopter will be automatically straightened to an appropriate posture while being dragged to move along the track;

B4: the control method for rapidly releasing a probe rod of the helicopter comprises the following steps:

B4.1: powering off the fifth electromagnetic reversing valve, retracting the mechanical claw unlocking cylinder, driving, by the connecting rod mechanism, the locking pin of the mechanical claw to retreat downwards, and opening the upper claw of the mechanical claw under the elastic action to release the probe rod of the helicopter;

B4.2: electrifying the sixth electromagnetic reversing valve, stretching out the centering lock unlocking cylinder, and driving, by by the connecting rod mechanism, the lock pin of the centering lock to retract;

B4.3: electrifying the ninth electromagnetic reversing valve, stretching out the emergency lock unlocking cylinder, and driving, by the connecting rod mechanism, lock pins of all emergency locks to retract;

B4.4: electrifying the eighth electromagnetic reversing valve, unlocking the externally controlled large flow hydraulic lock, and communicating two cavities of the thick hydraulic cylinder with the fuel tank, wherein the thick hydraulic cylinder is in a floating state;

B4.5: powering off both the third electromagnetic reserving valve and the fourth electromagnetic reserving valve, locking the stacked internally controlled hydraulic lock, and cutting off contact between the thick hydraulic cylinder and the load oilway;

B4.6: electrifying the seventh electromagnetic reversing valve, conducting the cartridge valve, and supplying, by the energy accumulator, oil to the load oilway; and B4.7: powering off the first electromagnetic reversing valve and electrifying the second electromagnetic reversing valve, controlling the rod cavity of the thin hydraulic cylinder to return oil and controlling the rodless cavity thereof to feed oil through the three-position four-way Y type hydraulically operated reversing valve, driving, by the thin hydraulic cylinder, the thick hydraulic cylinder to stretch out rapidly and synchronously, driving, by the left chain, the right chain and the speed increasing pulley block, the mechanical claw to leave the probe rod of the helicopter rapidly and stops till the mechanical claw returns to an initial position for waiting for next capture;

B5: the control method for transversely and mechanically locking the probe rod of the helicopter comprises the following steps:

B5.1: powering off the sixth electromagnetic reversing valve, retracting the centering lock unlocking cylinder, and driving, by the connecting rod mechanism, the lock pin of the centering lock to stretch out;

B5.2: powering off the ninth electromagnetic reversing valve, retracting the emergency lock unlocking cylinder, and driving, by the connecting rod mechanism, lock pins of all emergency locks to stretch out;

B5.3: when the mechanical claw is driven by an external force or an internal force to move to a middle position between any two adjacent emergency locks, clamping the mechanical claw between the two adjacent emergency locks; and when the mechanical claw moves till a center line thereof is aligned with a center line of the centering lock, inserting the lock pin of the centering lock into a cotter way of the centering lock on the back of the lower claw of the mechanical claw, wherein the mechanical claw is clamped in the transverse middle position of the rapid mooring device and cannot move; and B6: the control method for transversely and hydraulically locking the probe rod of the helicopter comprises the following steps:

B6.1: powering off the eighth electromagnetic reversing valve, the third electromagnetic reversing valve and the fourth electromagnetic reversing valve, controlling the stacked internally controlled hydraulic lock and the externally controlled large flow hydraulic lock to be locked to lock oilways of the rodless cavity and the rod cavity of the thick hydraulic cylinder by means of joint action, and forcibly and hydraulically locking the mechanical claw in a current position; and the safety protection method comprises: a power off routine protection method, an overload protection method, a chain fracture protection method, a safe mooring method after capture of the helicopter and an alarm method for filter clogging;

S1: the power off routine protection method comprises the following steps:

S1.1: after powering off the rapid mooring device, powering off all the third electromagnetic reversing valve, the fourth electromagnetic reversing valve and the eighth electromagnetic reversing valve, resulting in lock of the stacked internally controlled hydraulic lock and the externally controlled large flow hydraulic lock, wherein the oilways of the two cavities of the thick hydraulic cylinder are locked, and the mechanical claw is hydraulically locked transversely and cannot move; and S1.2: after powering off the rapid mooring device, powering off both the ninth electromagnetic reversing valve and the sixth electromagnetic reversing valve, retracting the emergency lock unlocking cylinder and the centering lock unlocking cylinder under the action of a spring force, and driving, by the connecting rod mechanism, both the lock pin of the centering lock and the lock pin of the emergency lock to stretch out; under a condition that the hydraulic lock in S1.1 cannot be completely locked, if the mechanical claw moves continuously, mechanically locking the mechanical claw between two adjacent transverse emergency locks or mechanically locking the mechanical claw in the transverse middle position of the rapid mooring device by the centering lock, wherein the operation safety of the offshore operation helicopter is further improved;

S2: the overload protection method comprises the following steps:

in the processes of mooring, pulling and straightening the helicopter, when a load face applied by the probe rod of the helicopter to the mechanical claw exceeds active power outputted by a hydraulic system due to force majeure, automatically locking the stacked internally controlled hydraulic lock and the externally controlled large flow hydraulic lock; locking the oilways of the two cavities of the thick hydraulic cylinder; and locking positions of the left chain, the right chain and the mechanical claw;

S3: the chain fracture protection method comprises the following steps:

when the left chain or the right chain ruptures, transmitting, by a chain rupture alarm sensor, a chain rupture alarm signal to an upper computer; giving, by the upper computer, a command of "mechanically locking the probe rod of the helicopter" to a rapid mooring device controller; after executing the abovementioned step B5, stretching out the lock pin of the centering lock and the lock pins of all the emergency locks, and if the mechanical claw moves continuously, mechanically locking the mechanical claw between two adjacent transverse emergency locks by the lock pins of the emergency locks or mechanically locking the mechanical claw in the transverse middle position of the rapid mooring device by the lock pin of the centering lock;

S4: the safe mooring method after capture of the helicopter comprises the following steps:

after executing the abovementioned step B1, stopping moving the mechanical claw and mooring the helicopter in a fixed position; when the system works normally, mooring the helicopter by step B5 or B6; and when the system is subjected to power off, overload or chain rupture failure, mooring the helicopter by steps S1, S2 and S3; and S5: the alarm method for filter clogging comprises the following steps:

in a process of feeding oil to the energy accumulator by the hydraulic pump, detecting a pressure difference value between the first pressure sensor and the second pressure sensor, and when the pressure difference value exceeds a preset alarm threshold of filter clogging, giving, by the rapid mooring device controller, an alarm signal to the upper controller; and the emergency action control method comprises: a basic action control method using the energy accumulator as a standby power source and a basic action control method using high pressure air as the standby power source;

E1: the basic action control method using the energy accumulator as a standby power source comprises the following steps:

under a condition that the hydraulic system is just powered off, the pressure of oil stored by the energy accumulator is greater than or equal to the minimum threshold pressure of the energy accumulator, completing, by the rapid mooring device, a plurality of cycles of actions of capturing and releasing the probe rod of the helicopter; by means of the basic action control method for the rapid mooring device in steps B1-B6, completing, by the rapid mooring device, the actions of capturing and releasing the probe rod of the helicopter by way of manually pushing setting buttons of the electromagnetic reversing valves replacing electrification of corresponding electromagnetic reversing valves; and E2: the basic action control method using high pressure air as the standby power source comprises the following steps:

after the rapid mooring device is powered off and energy stored in the energy accumulator is exhausted, connecting a hose of compressed air for ship to an air input port of a pneumatic hydraulic pump of the rapid mooring device, filling, by the pneumatic hydraulic pump, a liquid to the energy accumulator to reach a working pressure of the rapid mooring device; the subsequent operating method is the same as E1, and completing, by the rapid mooring device, the actions of capturing and releasing the probe rod of the helicopter by way of manually pushing setting buttons of the electromagnetic reversing valves replacing electrification of corresponding electromagnetic reversing valves.

7. A control method for the hydraulic system according to claim 3, comprising a routine action control method for the rapid mooring device, a safety protection control method and an emergency action control method, wherein the routine action control method for the rapid mooring device comprises: a control method for rapidly capturing a probe rod of the helicopter, a control method for transversely straightening the helicopter in a process of pulling the helicopter to come in and go out of a hangar, a control method for straightening the helicopter at the center in a process of pulling the helicopter to go out of the hangar, a control method for rapidly releasing the probe rod of the helicopter, a control method for transversely and hydraulically locking the probe rod of the helicopter and a control method for transversely and mechanically locking the probe rod of the helicopter;

B1: the control method for rapidly capturing a probe rod of the helicopter comprises the following steps:

B1.1: electrifying the fifth electromagnetic reversing valve, retracting the mechanical claw unlocking cylinder, driving a locking pin of a mechanical claw by a connecting rod mechanism to retreat downwards, and opening an upper claw of the mechanical claw under an elastic action;

B1.2: electrifying the sixth electromagnetic reversing valve, stretching out the centering lock unlocking cylinder, and driving a lock pin of a centering lock by the connecting rod mechanism to retract;

B1.3: electrifying the ninth electromagnetic reversing valve, stretching out the emergency lock unlocking cylinder, and driving lock pins of all emergency locks by the connecting rod mechanism to retract;

B1.4: electrifying the eighth electromagnetic reversing valve, unlocking the externally controlled large flow hydraulic lock, and communicating two cavities of the thick hydraulic cylinder with the fuel tank, wherein the thick hydraulic cylinder floats;

B1.5: the third electromagnetic reserving valve and the fourth electromagnetic reserving valve both being in a power-off state, locking the stacked internally controlled hydraulic lock, and cutting off contact between the thick hydraulic cylinder and the load oilway;

B1.6: electrifying the seventh electromagnetic reversing valve, conducting the cartridge valve, and supplying, by the energy accumulator, oil to the load oilway; and B1.7: the first electromagnetic reversing valve and the second electromagnetic reversing valve being powered off, controlling a rod cavity of the thin hydraulic cylinder to feed oil and controlling a rodless cavity thereof to return oil through the three-position four-way Y type hydraulically operated reversing valve, driving, by the thin hydraulic cylinder, the thick hydraulic cylinder to retract rapidly and synchronously, driving, by a left chain, a right chain and a speed increasing pulley block, the opened mechanical claw to move rapidly, and pushing, by the probe rod of the helicopter, the upper claw of the mechanical claw to rotate till the upper claw of the mechanical claw contacts with the probe rod of the helicopter, closing the upper claw of the mechanical claw and a lower claw of the mechanical claw, and lifting the locking pin of the mechanical claw upwards under the action of a twisting force of a square shaft spring to lock the upper claw of the mechanical claw, so as to capture and lock the probe rod of the helicopter;

B2: the control method for transversely straightening the helicopter in a process of pulling the helicopter to come in and go out of a hangar comprises a control method for straightening the helicopter towards a starboard and a control method for straightening the helicopter towards a larboard:

B2.1: the control method for straightening the helicopter towards a starboard comprises the following steps:

B2.1.1: powering off the fifth electromagnetic reversing valve, and stretching out the mechanical claw unlocking cylinder to prevent the mechanical claw from being opened;

B2.1.2: electrifying the sixth electromagnetic reversing valve, stretching out the centering lock unlocking cylinder, and driving, by the connecting rod mechanism, the lock pin of the centering lock to retract;

B2.1.3: electrifying the ninth electromagnetic reversing valve, stretching out the emergency lock unlocking cylinder, and driving, by the connecting rod mechanism, lock pins of the emergency locks to retract;

B2.1.4: powering off the eighth electromagnetic reversing valve, and locking the externally controlled large flow hydraulic lock;

B2.1.5: powering off the seventh electromagnetic reversing valve, closing the cartridge valve, and driving, only by the hydraulic pump, the actions of the thick and thin hydraulic cylinders;

B2.1.6: powering off both the first electromagnetic reversing valve and the second electromagnetic reversing valve, controlling the three-position four-way Y type hydraulically operated reversing valve to be located at the center, connecting both the rod cavity and the rodless cavity of the thin hydraulic cylinder to the fuel tank, wherein the thin hydraulic cylinder follows; and B2.1.7: electrifying the third electromagnetic reversing valve and the fourth electromagnetic reversing valve, controlling the rod cavity of the thick hydraulic cylinder to return oil and controlling the rodless cavity thereof to feed oil through the stacked double throttle check valve and the stacked internally controlled hydraulic lock, driving, by the thick hydraulic cylinder, the thin hydraulic cylinder to stretch out synchronously, and driving, by by the left chain, the right chain and the speed increasing pulley block, the mechanical claw to generate a slow speed motion and a high output, so as to complete the operation of straightening the offshore operation helicopter towards the starboard in the process of pulling the helicopter to come in and go out of the hangar;

B2.2: the control method for straightening the helicopter towards a larboard comprises the following steps:

B2.2.1: powering off the fifth electromagnetic reversing valve, and stretching out the mechanical claw unlocking cylinder to prevent the mechanical claw from being opened;

B2.2.2: electrifying the sixth electromagnetic reversing valve, stretching out the centering lock unlocking cylinder, and driving, by the connecting rod mechanism, the lock pin of the centering lock to retract;

B2.2.3: electrifying the ninth electromagnetic reversing valve, stretching out the emergency lock unlocking cylinder, and driving, by the connecting rod mechanism, lock pins of all emergency locks to retract;

B2.2.4: powering off the eighth electromagnetic reversing valve, and locking the externally controlled large flow hydraulic lock;

B2.2.5: powering off the seventh electromagnetic reversing valve, closing the cartridge valve, and driving, only by the hydraulic pump, the actions of the thick and thin hydraulic cylinders;

B2.2.6: powering off the first electromagnetic reversing valve and the second electromagnetic reversing valve, controlling the three-position four-way Y type hydraulically operated reversing valve to be located in a left position, feeding, by the rod cavity of the thin hydraulic cylinder, oil and returning, by the rodless cavity thereof, oil, and retracting the thin hydraulic cylinder; and B2.2.7: powering off the third electromagnetic reversing valve and the fourth electromagnetic reversing valve, controlling the rod cavity of the thick hydraulic cylinder to feed oil and controlling the rodless cavity thereof to return oil through the stacked double throttle check valve and the stacked internally controlled hydraulic lock, retracting the thick hydraulic cylinder and the thin hydraulic cylinder together, and driving, by by the left chain, the right chain and the speed increasing pulley block, the mechanical claw to generate the slow speed motion and the high output, so as to complete the operation of straightening the offshore operation helicopter towards the larboard in the process of pulling the helicopter to come in and go out of the hangar;

B3: the control method for straightening the helicopter at the center in a process of pulling the helicopter to go out of the hangar comprises the following steps:

B3.1: powering off the fifth electromagnetic reversing valve, and stretching out the mechanical claw unlocking cylinder to prevent the mechanical claw from being opened;

B3.2: powering off the sixth electromagnetic reversing valve, retracting the centering lock unlocking cylinder, and driving, by the connecting rod mechanism, the lock pin of the centering lock to stretch out;

B3.3: electrifying the ninth electromagnetic reversing valve, stretching out the emergency lock unlocking cylinder, and driving, by the connecting rod mechanism, lock pins of all emergency locks to retract;

B3.4: adjusting the mechanical claw grabbing the probe rod to move towards a center line of the rapid mooring device according to the straightening steps of B2.1.4-B2.1.7 or B2.2.4-B2.2.7; when a center line of the mechanical claw is aligned with a center line of the lock pin of the centering lock, inserting the lock pin of the centering lock into a cotter way on a back side of the mechanical claw, and clamping the mechanical claw in a transverse middle position of the rapid mooring device, wherein in the process of pulling the rapid mooring device to go out of the hangar by a traction winch, the probe rod of the helicopter travels along a center line of a track on a deck all the time, and the helicopter will be automatically straightened to an appropriate posture while being dragged to move along the track;

B4: the control method for rapidly releasing a probe rod of the helicopter comprises the following steps:

B4.1: powering off the fifth electromagnetic reversing valve, retracting the mechanical claw unlocking cylinder, driving, by the connecting rod mechanism, the locking pin of the mechanical claw to retreat downwards, and opening the upper claw of the mechanical claw under the elastic action to release the probe rod of the helicopter;

B4.2: electrifying the sixth electromagnetic reversing valve, stretching out the centering lock unlocking cylinder, and driving, by by the connecting rod mechanism, the lock pin of the centering lock to retract;

B4.3: electrifying the ninth electromagnetic reversing valve, stretching out the emergency lock unlocking cylinder, and driving, by the connecting rod mechanism, lock pins of all emergency locks to retract;

B4.4: electrifying the eighth electromagnetic reversing valve, unlocking the externally controlled large flow hydraulic lock, and communicating two cavities of the thick hydraulic cylinder with the fuel tank, wherein the thick hydraulic cylinder is in a floating state;

B4.5: powering off both the third electromagnetic reserving valve and the fourth electromagnetic reserving valve, locking the stacked internally controlled hydraulic lock, and cutting off contact between the thick hydraulic cylinder and the load oilway;

B4.6: electrifying the seventh electromagnetic reversing valve, conducting the cartridge valve, and supplying, by the energy accumulator, oil to the load oilway; and B4.7: powering off the first electromagnetic reversing valve and electrifying the second electromagnetic reversing valve, controlling the rod cavity of the thin hydraulic cylinder to return oil and controlling the rodless cavity thereof to feed oil through the three-position four-way Y type hydraulically operated reversing valve, driving, by the thin hydraulic cylinder, the thick hydraulic cylinder to stretch out rapidly and synchronously, driving, by the left chain, the right chain and the speed increasing pulley block, the mechanical claw to leave the probe rod of the helicopter rapidly and stops till the mechanical claw returns to an initial position for waiting for next capture;

B5: the control method for transversely and mechanically locking the probe rod of the helicopter comprises the following steps:

B5.1: powering off the sixth electromagnetic reversing valve, retracting the centering lock unlocking cylinder, and driving, by the connecting rod mechanism, the lock pin of the centering lock to stretch out;

B5.2: powering off the ninth electromagnetic reversing valve, retracting the emergency lock unlocking cylinder, and driving, by the connecting rod mechanism, lock pins of all emergency locks to stretch out;

B5.3: when the mechanical claw is driven by an external force or an internal force to move to a middle position between any two adjacent emergency locks, clamping the mechanical claw between the two adjacent emergency locks; and when the mechanical claw moves till a center line thereof is aligned with a center line of the centering lock, inserting the lock pin of the centering lock into a cotter way of the centering lock on the back of the lower claw of the mechanical claw, wherein the mechanical claw is clamped in the transverse middle position of the rapid mooring device and cannot move; and B6: the control method for transversely and hydraulically locking the probe rod of the helicopter comprises the following steps:

B6.1: powering off the eighth electromagnetic reversing valve, the third electromagnetic reversing valve and the fourth electromagnetic reversing valve, controlling the stacked internally controlled hydraulic lock and the externally controlled large flow hydraulic lock to be locked to lock oilways of the rodless cavity and the rod cavity of the thick hydraulic cylinder by means of joint action, and forcibly and hydraulically locking the mechanical claw in a current position; and the safety protection method comprises: a power off routine protection method, an overload protection method, a chain fracture protection method, a safe mooring method after capture of the helicopter and an alarm method for filter clogging;

S1: the power off routine protection method comprises the following steps:

S1.1: after powering off the rapid mooring device, powering off all the third electromagnetic reversing valve, the fourth electromagnetic reversing valve and the eighth electromagnetic reversing valve, resulting in lock of the stacked internally controlled hydraulic lock and the externally controlled large flow hydraulic lock, wherein the oilways of the two cavities of the thick hydraulic cylinder are locked, and the mechanical claw is hydraulically locked transversely and cannot move; and S1.2: after powering off the rapid mooring device, powering off both the ninth electromagnetic reversing valve and the sixth electromagnetic reversing valve, retracting the emergency lock unlocking cylinder and the centering lock unlocking cylinder under the action of a spring force, and driving, by the connecting rod mechanism, both the lock pin of the centering lock and the lock pin of the emergency lock to stretch out; under a condition that the hydraulic lock in S1.1 cannot be completely locked, if the mechanical claw moves continuously, mechanically locking the mechanical claw between two adjacent transverse emergency locks or mechanically locking the mechanical claw in the transverse middle position of the rapid mooring device by the centering lock, wherein the operation safety of the offshore operation helicopter is further improved;

S2: the overload protection method comprises the following steps:

in the processes of mooring, pulling and straightening the helicopter, when a load face applied by the probe rod of the helicopter to the mechanical claw exceeds active power outputted by a hydraulic system due to force majeure, automatically locking the stacked internally controlled hydraulic lock and the externally controlled large flow hydraulic lock; locking the oilways of the two cavities of the thick hydraulic cylinder; and locking positions of the left chain, the right chain and the mechanical claw;

S3: the chain fracture protection method comprises the following steps:

when the left chain or the right chain ruptures, transmitting, by a chain rupture alarm sensor, a chain rupture alarm signal to an upper computer; giving, by the upper computer, a command of "mechanically locking the probe rod of the helicopter" to a rapid mooring device controller; after executing the abovementioned step B5, stretching out the lock pin of the centering lock and the lock pins of all the emergency locks, and if the mechanical claw moves continuously, mechanically locking the mechanical claw between two adjacent transverse emergency locks by the lock pins of the emergency locks or mechanically locking the mechanical claw in the transverse middle position of the rapid mooring device by the lock pin of the centering lock;

S4: the safe mooring method after capture of the helicopter comprises the following steps:

after executing the abovementioned step B1, stopping moving the mechanical claw and mooring the helicopter in a fixed position; when the system works normally, mooring the helicopter by step B5 or B6; and when the system is subjected to power off, overload or chain rupture failure, mooring the helicopter by steps S1, S2 and S3; and S5: the alarm method for filter clogging comprises the following steps:

in a process of feeding oil to the energy accumulator by the hydraulic pump, detecting a pressure difference value between the first pressure sensor and the second pressure sensor, and when the pressure difference value exceeds a preset alarm threshold of filter clogging, giving, by the rapid mooring device controller, an alarm signal to the upper controller; and the emergency action control method comprises: a basic action control method using the energy accumulator as a standby power source and a basic action control method using high pressure air as the standby power source;

E1: the basic action control method using the energy accumulator as a standby power source comprises the following steps:

under a condition that the hydraulic system is just powered off, the pressure of oil stored by the energy accumulator is greater than or equal to the minimum threshold pressure of the energy accumulator, completing, by the rapid mooring device, a plurality of cycles of actions of capturing and releasing the probe rod of the helicopter; by means of the basic action control method for the rapid mooring device in steps B1-B6, completing, by the rapid mooring device, the actions of capturing and releasing the probe rod of the helicopter by way of manually pushing setting buttons of the electromagnetic reversing valves replacing electrification of corresponding electromagnetic reversing valves; and E2: the basic action control method using high pressure air as the standby power source comprises the following steps:

after the rapid mooring device is powered off and energy stored in the energy accumulator is exhausted, connecting a hose of compressed air for ship to an air input port of a pneumatic hydraulic pump of the rapid mooring device, filling, by the pneumatic hydraulic pump, a liquid to the energy accumulator to reach a working pressure of the rapid mooring device; the subsequent operating method is the same as E1, and completing, by the rapid mooring device, the actions of capturing and releasing the probe rod of the helicopter by way of manually pushing setting buttons of the electromagnetic reversing valves replacing electrification of corresponding electromagnetic reversing valves.

8. A control method for the hydraulic system according to claim 4, comprising a routine action control method for the rapid mooring device, a safety protection control method and an emergency action control method, wherein the routine action control method for the rapid mooring device comprises: a control method for rapidly capturing a probe rod of the helicopter, a control method for transversely straightening the helicopter in a process of pulling the helicopter to come in and go out of a hangar, a control method for straightening the helicopter at the center in a process of pulling the helicopter to go out of the hangar, a control method for rapidly releasing the probe rod of the helicopter, a control method for transversely and hydraulically locking the probe rod of the helicopter and a control method for transversely and mechanically locking the probe rod of the helicopter;

B1: the control method for rapidly capturing a probe rod of the helicopter comprises the following steps:

B1.1: electrifying the fifth electromagnetic reversing valve, retracting the mechanical claw unlocking cylinder, driving a locking pin of a mechanical claw by a connecting rod mechanism to retreat downwards, and opening an upper claw of the mechanical claw under an elastic action;

B1.2: electrifying the sixth electromagnetic reversing valve, stretching out the centering lock unlocking cylinder, and driving a lock pin of a centering lock by the connecting rod mechanism to retract;

B1.3: electrifying the ninth electromagnetic reversing valve, stretching out the emergency lock unlocking cylinder, and driving lock pins of all emergency locks by the connecting rod mechanism to retract;

B1.4: electrifying the eighth electromagnetic reversing valve, unlocking the externally controlled large flow hydraulic lock, and communicating two cavities of the thick hydraulic cylinder with the fuel tank, wherein the thick hydraulic cylinder floats;

B1.5: the third electromagnetic reserving valve and the fourth electromagnetic reserving valve both being in a power-off state, locking the stacked internally controlled hydraulic lock, and cutting off contact between the thick hydraulic cylinder and the load oilway;

B1.6: electrifying the seventh electromagnetic reversing valve, conducting the cartridge valve, and supplying, by the energy accumulator, oil to the load oilway; and B1.7: the first electromagnetic reversing valve and the second electromagnetic reversing valve being powered off, controlling a rod cavity of the thin hydraulic cylinder to feed oil and controlling a rodless cavity thereof to return oil through the three-position four-way Y type hydraulically operated reversing valve, driving, by the thin hydraulic cylinder, the thick hydraulic cylinder to retract rapidly and synchronously, driving, by a left chain, a right chain and a speed increasing pulley block, the opened mechanical claw to move rapidly, and pushing, by the probe rod of the helicopter, the upper claw of the mechanical claw to rotate till the upper claw of the mechanical claw contacts with the probe rod of the helicopter, closing the upper claw of the mechanical claw and a lower claw of the mechanical claw, and lifting the locking pin of the mechanical claw upwards under the action of a twisting force of a square shaft spring to lock the upper claw of the mechanical claw, so as to capture and lock the probe rod of the helicopter;

B2: the control method for transversely straightening the helicopter in a process of pulling the helicopter to come in and go out of a hangar comprises a control method for straightening the helicopter towards a starboard and a control method for straightening the helicopter towards a larboard:

B2.1: the control method for straightening the helicopter towards a starboard comprises the following steps:

B2.1.1: powering off the fifth electromagnetic reversing valve, and stretching out the mechanical claw unlocking cylinder to prevent the mechanical claw from being opened;

B2.1.2: electrifying the sixth electromagnetic reversing valve, stretching out the centering lock unlocking cylinder, and driving, by the connecting rod mechanism, the lock pin of the centering lock to retract;

B2.1.3: electrifying the ninth electromagnetic reversing valve, stretching out the emergency lock unlocking cylinder, and driving, by the connecting rod mechanism, lock pins of the emergency locks to retract;

B2.1.4: powering off the eighth electromagnetic reversing valve, and locking the externally controlled large flow hydraulic lock;

B2.1.5: powering off the seventh electromagnetic reversing valve, closing the cartridge valve, and driving, only by the hydraulic pump, the actions of the thick and thin hydraulic cylinders;

B2.1.6: powering off both the first electromagnetic reversing valve and the second electromagnetic reversing valve, controlling the three-position four-way Y type hydraulically operated reversing valve to be located at the center, connecting both the rod cavity and the rodless cavity of the thin hydraulic cylinder to the fuel tank, wherein the thin hydraulic cylinder follows; and B2.1.7: electrifying the third electromagnetic reversing valve and the fourth electromagnetic reversing valve, controlling the rod cavity of the thick hydraulic cylinder to return oil and controlling the rodless cavity thereof to feed oil through the stacked double throttle check valve and the stacked internally controlled hydraulic lock, driving, by the thick hydraulic cylinder, the thin hydraulic cylinder to stretch out synchronously, and driving, by by the left chain, the right chain and the speed increasing pulley block, the mechanical claw to generate a slow speed motion and a high output, so as to complete the operation of straightening the offshore operation helicopter towards the starboard in the process of pulling the helicopter to come in and go out of the hangar;

B2.2: the control method for straightening the helicopter towards a larboard comprises the following steps:

B2.2.1: powering off the fifth electromagnetic reversing valve, and stretching out the mechanical claw unlocking cylinder to prevent the mechanical claw from being opened;

B2.2.2: electrifying the sixth electromagnetic reversing valve, stretching out the centering lock unlocking cylinder, and driving, by the connecting rod mechanism, the lock pin of the centering lock to retract;

B2.2.3: electrifying the ninth electromagnetic reversing valve, stretching out the emergency lock unlocking cylinder, and driving, by the connecting rod mechanism, lock pins of all emergency locks to retract;

B2.2.4: powering off the eighth electromagnetic reversing valve, and locking the externally controlled large flow hydraulic lock;

B2.2.5: powering off the seventh electromagnetic reversing valve, closing the cartridge valve, and driving, only by the hydraulic pump, the actions of the thick and thin hydraulic cylinders;

B2.2.6: powering off the first electromagnetic reversing valve and the second electromagnetic reversing valve, controlling the three-position four-way Y type hydraulically operated reversing valve to be located in a left position, feeding, by the rod cavity of the thin hydraulic cylinder, oil and returning, by the rodless cavity thereof, oil, and retracting the thin hydraulic cylinder; and B2.2.7: powering off the third electromagnetic reversing valve and the fourth electromagnetic reversing valve, controlling the rod cavity of the thick hydraulic cylinder to feed oil and controlling the rodless cavity thereof to return oil through the stacked double throttle check valve and the stacked internally controlled hydraulic lock, retracting the thick hydraulic cylinder and the thin hydraulic cylinder together, and driving, by by the left chain, the right chain and the speed increasing pulley block, the mechanical claw to generate the slow speed motion and the high output, so as to complete the operation of straightening the offshore operation helicopter towards the larboard in the process of pulling the helicopter to come in and go out of the hangar;

B3: the control method for straightening the helicopter at the center in a process of pulling the helicopter to go out of the hangar comprises the following steps:

B3.1: powering off the fifth electromagnetic reversing valve, and stretching out the mechanical claw unlocking cylinder to prevent the mechanical claw from being opened;

B3.2: powering off the sixth electromagnetic reversing valve, retracting the centering lock unlocking cylinder, and driving, by the connecting rod mechanism, the lock pin of the centering lock to stretch out;

B3.3: electrifying the ninth electromagnetic reversing valve, stretching out the emergency lock unlocking cylinder, and driving, by the connecting rod mechanism, lock pins of all emergency locks to retract;

B3.4: adjusting the mechanical claw grabbing the probe rod to move towards a center line of the rapid mooring device according to the straightening steps of B2.1.4-B2.1.7 or B2.2.4-B2.2.7; when a center line of the mechanical claw is aligned with a center line of the lock pin of the centering lock, inserting the lock pin of the centering lock into a cotter way on a back side of the mechanical claw, and clamping the mechanical claw in a transverse middle position of the rapid mooring device, wherein in the process of pulling the rapid mooring device to go out of the hangar by a traction winch, the probe rod of the helicopter travels along a center line of a track on a deck all the time, and the helicopter will be automatically straightened to an appropriate posture while being dragged to move along the track;

B4: the control method for rapidly releasing a probe rod of the helicopter comprises the following steps:

B4.1: powering off the fifth electromagnetic reversing valve, retracting the mechanical claw unlocking cylinder, driving, by the connecting rod mechanism, the locking pin of the mechanical claw to retreat downwards, and opening the upper claw of the mechanical claw under the elastic action to release the probe rod of the helicopter;

B4.2: electrifying the sixth electromagnetic reversing valve, stretching out the centering lock unlocking cylinder, and driving, by by the connecting rod mechanism, the lock pin of the centering lock to retract;

B4.3: electrifying the ninth electromagnetic reversing valve, stretching out the emergency lock unlocking cylinder, and driving, by the connecting rod mechanism, lock pins of all emergency locks to retract;

B4.4: electrifying the eighth electromagnetic reversing valve, unlocking the externally controlled large flow hydraulic lock, and communicating two cavities of the thick hydraulic cylinder with the fuel tank, wherein the thick hydraulic cylinder is in a floating state;

B4.5: powering off both the third electromagnetic reserving valve and the fourth electromagnetic reserving valve, locking the stacked internally controlled hydraulic lock, and cutting off contact between the thick hydraulic cylinder and the load oilway;

B4.6: electrifying the seventh electromagnetic reversing valve, conducting the cartridge valve, and supplying, by the energy accumulator, oil to the load oilway; and B4.7: powering off the first electromagnetic reversing valve and electrifying the second electromagnetic reversing valve, controlling the rod cavity of the thin hydraulic cylinder to return oil and controlling the rodless cavity thereof to feed oil through the three-position four-way Y type hydraulically operated reversing valve, driving, by the thin hydraulic cylinder, the thick hydraulic cylinder to stretch out rapidly and synchronously, driving, by the left chain, the right chain and the speed increasing pulley block, the mechanical claw to leave the probe rod of the helicopter rapidly and stops till the mechanical claw returns to an initial position for waiting for next capture;

B5: the control method for transversely and mechanically locking the probe rod of the helicopter comprises the following steps:

B5.1: powering off the sixth electromagnetic reversing valve, retracting the centering lock unlocking cylinder, and driving, by the connecting rod mechanism, the lock pin of the centering lock to stretch out;

B5.2: powering off the ninth electromagnetic reversing valve, retracting the emergency lock unlocking cylinder, and driving, by the connecting rod mechanism, lock pins of all emergency locks to stretch out;

B5.3: when the mechanical claw is driven by an external force or an internal force to move to a middle position between any two adjacent emergency locks, clamping the mechanical claw between the two adjacent emergency locks; and when the mechanical claw moves till a center line thereof is aligned with a center line of the centering lock, inserting the lock pin of the centering lock into a cotter way of the centering lock on the back of the lower claw of the mechanical claw, wherein the mechanical claw is clamped in the transverse middle position of the rapid mooring device and cannot move; and B6: the control method for transversely and hydraulically locking the probe rod of the helicopter comprises the following steps:

B6.1: powering off the eighth electromagnetic reversing valve, the third electromagnetic reversing valve and the fourth electromagnetic reversing valve, controlling the stacked internally controlled hydraulic lock and the externally controlled large flow hydraulic lock to be locked to lock oilways of the rodless cavity and the rod cavity of the thick hydraulic cylinder by means of joint action, and forcibly and hydraulically locking the mechanical claw in a current position; and the safety protection method comprises: a power off routine protection method, an overload protection method, a chain fracture protection method, a safe mooring method after capture of the helicopter and an alarm method for filter clogging;

S1: the power off routine protection method comprises the following steps:

S1.1: after powering off the rapid mooring device, powering off all the third electromagnetic reversing valve, the fourth electromagnetic reversing valve and the eighth electromagnetic reversing valve, resulting in lock of the stacked internally controlled hydraulic lock and the externally controlled large flow hydraulic lock, wherein the oilways of the two cavities of the thick hydraulic cylinder are locked, and the mechanical claw is hydraulically locked transversely and cannot move; and S1.2: after powering off the rapid mooring device, powering off both the ninth electromagnetic reversing valve and the sixth electromagnetic reversing valve, retracting the emergency lock unlocking cylinder and the centering lock unlocking cylinder under the action of a spring force, and driving, by the connecting rod mechanism, both the lock pin of the centering lock and the lock pin of the emergency lock to stretch out; under a condition that the hydraulic lock in S1.1 cannot be completely locked, if the mechanical claw moves continuously, mechanically locking the mechanical claw between two adjacent transverse emergency locks or mechanically locking the mechanical claw in the transverse middle position of the rapid mooring device by the centering lock, wherein the operation safety of the offshore operation helicopter is further improved;

S2: the overload protection method comprises the following steps:

in the processes of mooring, pulling and straightening the helicopter, when a load face applied by the probe rod of the helicopter to the mechanical claw exceeds active power outputted by a hydraulic system due to force majeure, automatically locking the stacked internally controlled hydraulic lock and the externally controlled large flow hydraulic lock; locking the oilways of the two cavities of the thick hydraulic cylinder; and locking positions of the left chain, the right chain and the mechanical claw;

S3: the chain fracture protection method comprises the following steps:

when the left chain or the right chain ruptures, transmitting, by a chain rupture alarm sensor, a chain rupture alarm signal to an upper computer; giving, by the upper computer, a command of "mechanically locking the probe rod of the helicopter" to a rapid mooring device controller; after executing the abovementioned step B5, stretching out the lock pin of the centering lock and the lock pins of all the emergency locks, and if the mechanical claw moves continuously, mechanically locking the mechanical claw between two adjacent transverse emergency locks by the lock pins of the emergency locks or mechanically locking the mechanical claw in the transverse middle position of the rapid mooring device by the lock pin of the centering lock;

S4: the safe mooring method after capture of the helicopter comprises the following steps:

after executing the abovementioned step B1, stopping moving the mechanical claw and mooring the helicopter in a fixed position; when the system works normally, mooring the helicopter by step B5 or B6; and when the system is subjected to power off, overload or chain rupture failure, mooring the helicopter by steps S1, S2 and S3; and S5: the alarm method for filter clogging comprises the following steps:

in a process of feeding oil to the energy accumulator by the hydraulic pump, detecting a pressure difference value between the first pressure sensor and the second pressure sensor, and when the pressure difference value exceeds a preset alarm threshold of filter clogging, giving, by the rapid mooring device controller, an alarm signal to the upper controller; and the emergency action control method comprises: a basic action control method using the energy accumulator as a standby power source and a basic action control method using high pressure air as the standby power source;

E1: the basic action control method using the energy accumulator as a standby power source comprises the following steps:

under a condition that the hydraulic system is just powered off, the pressure of oil stored by the energy accumulator is greater than or equal to the minimum threshold pressure of the energy accumulator, completing, by the rapid mooring device, a plurality of cycles of actions of capturing and releasing the probe rod of the helicopter; by means of the basic action control method for the rapid mooring device in steps B1-B6, completing, by the rapid mooring device, the actions of capturing and releasing the probe rod of the helicopter by way of manually pushing setting buttons of the electromagnetic reversing valves replacing electrification of corresponding electromagnetic reversing valves; and E2: the basic action control method using high pressure air as the standby power source comprises the following steps:

after the rapid mooring device is powered off and energy stored in the energy accumulator is exhausted, connecting a hose of compressed air for ship to an air input port of a pneumatic hydraulic pump of the rapid mooring device, filling, by the pneumatic hydraulic pump, a liquid to the energy accumulator to reach a working pressure of the rapid mooring device; the subsequent operating method is the same as E1, and completing, by the rapid mooring device, the actions of capturing and releasing the probe rod of the helicopter by way of manually pushing setting buttons of the electromagnetic reversing valves replacing electrification of corresponding electromagnetic reversing valves.

\* \* \* \* \*